INVENTOR.
CHARLES A. VIETOR
NORMAN S. BLESSUM

BY Christie, Parker & Hale
ATTORNEYS

INVENTOR.
CHARLES A. VIETOR
NORMAN S. BLESSUM

BY Christie, Parker & Hale
ATTORNEYS

SHIFT AND BUFFER CIRCUITRY

Filed Sept. 13, 1966 11 Sheets-Sheet 3

INVENTOR.
CHARLES A. VIETOR
NORMAN S. BLESSUM
BY
Christie, Parker & Hale
ATTORNEYS

SHIFT AND BUFFER CIRCUITRY

INVENTOR.
CHARLES A. VIETOR
NORMAN S. BLESSUM

BY Christie, Parker & Hale
ATTORNEYS

SHIFT AND BUFFER CIRCUITRY

INVENTOR.
CHARLES. A. VIETOR
NORMAN S. BLESSUM

BY

Christie, Parker & Hale
ATTORNEYS

INVENTOR.
CHARLES A. VIETOR
NORMAN S. BLESSUM
BY
Christie, Parker & Hale
ATTORNEYS INVENTOR.
CHARLES A. VIETOR
NORMAN S. BLESSUM
BY
Christie, Parker & Hale
ATTORNEYS United States Patent Office 3,417,377

Patented Dec. 17, 1968

3,417,377

SHIFT AND BUFFER CIRCUITRY

Charles A. Vietor, Westminster, and Norman S. Blessum, Covina, Calif., assignors to Burroughs Corporation, Detroit, Mich., a corporation of Michigan Filed Sept. 13, 1966, Ser. No. 579,118
21 Claims. (Cl. 340—172.5)

Figure 1:
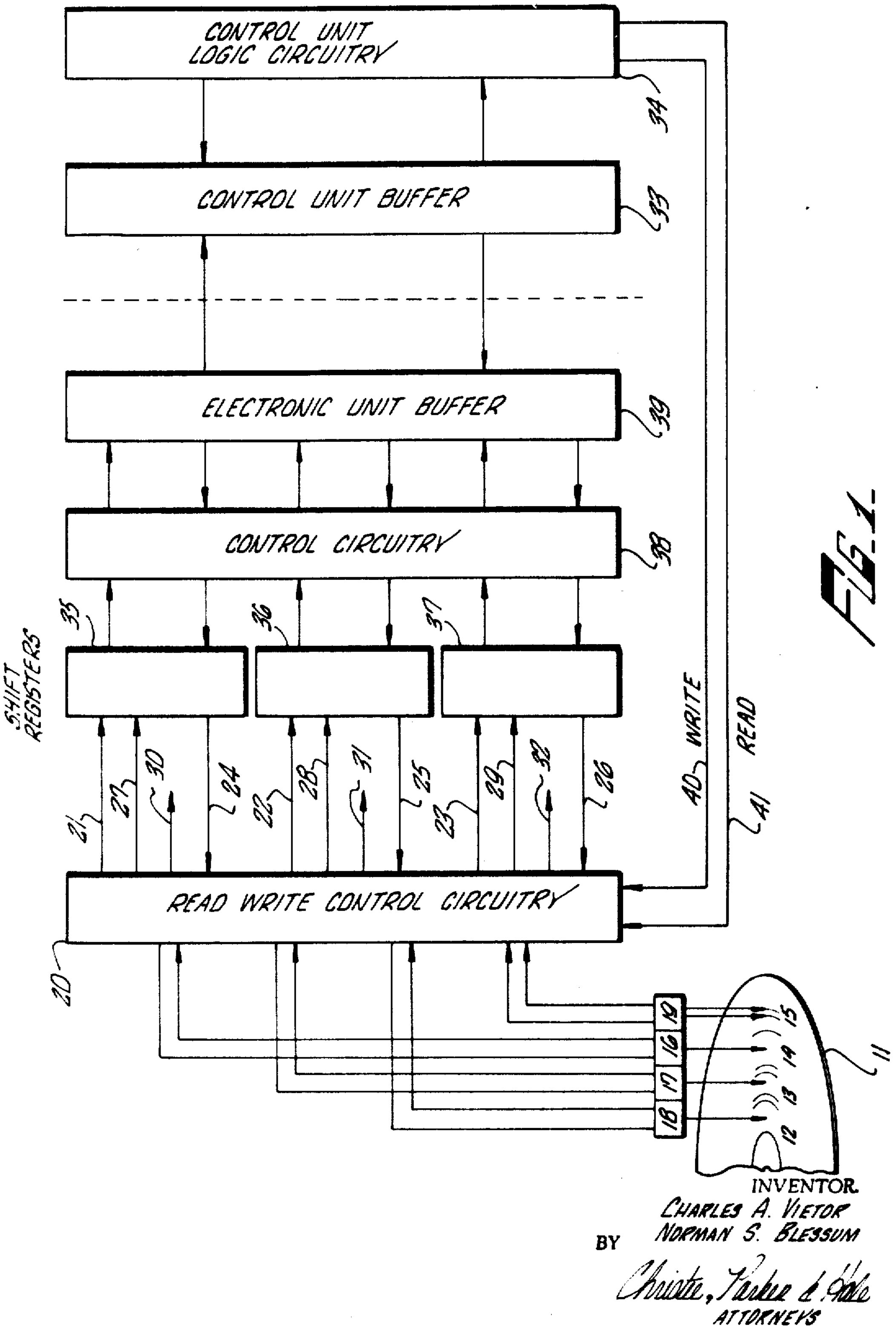

This invention relates to electrical circuitry for shifting and buffering digital information and more particularly to such circuitry for transferring digital information characters between first storage means with respect to which bytes of each character are asynchronously written and read and a second storage means with respect to which bytes of each character are synchronously written and read.

It frequently is advantageous in data processing operations to receive serial bits of information from several channels and subsequently to combine bits received over the several channels into information characters thereafter handled in parallel. Conversely, information characters received in parallel may advantageously be separated into a plurality of bytes with the bits of each byte then being serially transmitted over separate channels.

A storage device which advantageously provides a plurality of separate channels or tracks for the storage of information bits is a magnetic disk file of the type described in a copending application of Ralph A. Gleim, Erwin A. Hauck and Richard C. Simonsen, Ser. No. 306,365 now abandoned, filed Sept. 3, 1963 and assigned to the assignee of the present application. Thus, for example, such a magnetic disk may have three separate information zones with information bits serially stored on tracks within each zone and with different data frequencies being utilized from one zone to the next in order to achieve more efficient data handling. A first byte of an information character may advantageously be stored in one zone, a second byte of the character in a second zone and a third byte in the third zone. Separate read-write heads associated with each track enable the bytes of a single character to be simultaneously written onto or read from the tracks of the disk.

Although the reading of information from the multiple zones of the disk file proceeds simultaneously, they are asychronous. Signals read from the three zones are asynchronous as a result of any of numerous causes which may produce a phase shift between the three zones. Thus, for example, movement of a head reading information from one of the zones would produce a phase shift. Additionally, jitter of the disk, variations in head gaps, temperature changes, skew, or vibration would cause such phase shifts. Where information bits serially received over several channels must be combined into characters which are subsequently handled in parallel, such asynchronism has presented a serious problem.

An advantage of the present invention is that it provides improved means for synchronizing information bits asynchronously read from several channels.

Another advantage of the present invention is that it provides means for receiving information bits from several asynchronous channels each of which presents bits at a different frequency, for assembling the bits into characters having a predetermined number of bits from each channel, and for transmitting such characters in parallel.

Yet another advantage of the present invention is that it provides improved means for receiving information characters in parallel, separating each character into bytes and serially transmitting the bits of each byte over a separate channel.

In brief, the preceding and additional advantages may be achieved by means of an improved combination of shifting, buffering and control circuitry provided between storage means in which information is stored in separate tracks and a remote unit in which characters made up of bits from all such tracks are utilized.

Although the description herein is directed to a magnetic disk file, the present invention is applicable to any digital asynchronous input information which must be synchronized. Thus, for example, the present invention may be used to synchronize tracks on two separate magnetic tapes or even to synchronize information from tracks on the same tape were they to get out of phase as a result of skew or the like. The input information need not even be magnetic and the present invention may be utilized, for example, to synchronize two incoming telemetering channels. Although channels utilizing different transmission frequencies are described herein, the invention is equally applicable in cases where the same data frequency is utilized in all the channels. The remote unit may be any unit which receives or transmits, in parallel, groups of data bits which are made up of bytes, each of which is asynchronously received from or transmitted to a separate channel. The remote unit may, for example, be the control unit of a data processing system.

In one embodiment of the present invention, information characters are stored in three zones of a magnetic disk file, each character being divided into three groups of bits designated bytes and each byte of a character being stored in a separate zone. The bits of each byte are serially read from the zones and shifted into shift registers. The shift of bits from each zone proceeds independently and in response to clock signals associated with each zone. Control circuitry determines when a complete byte has been shifted into the shift registers and, in response to such determination, the byte is transferred to a shift register. The transfer of bits from the zones of the disk to their respective shift registers and buffers may be considered as occurring in three independent channels operating simultaneously and in parallel. Each channel has its own clock signals associated therewith and the clock rates may be different for each channel. Thus, for example, the clock rate associated with a first channel may be 1 megacycle, that associated with a second channel 1.5 megacycles, and that associated with the third 2 megacycles. In such an arrangement, the byte associated with the first channel may advantageously be made up of two bits; that associated with the second channel, three bits; and that associated with the third channel, four bits. Additional control circuitry determines when all three bytes have been transferred to the buffer circuits of the three channels and, upon such determination, all of the bits of an entire character comprising the three bytes are presented in parallel to a buffer circuit within a remote unit. Bits of succeeding characters are continuously shifted serially into the shift registers. As soon as each shift register contains an entire byte, the byte is transferred to a buffer circuit. Only when all three buffer circuits have been loaded, are the three bytes of a single character transmitted to a remote unit. Thus, digital data signals received asynchronously and serially over a plurality of channels are advantageously synchronized and characters comprising bits from all the channels are presented in parallel to remote circuitry. The disk file and the shift registers and buffers of each channel may advantageously be part of an electronic unit and the remote circuitry part of a control unit of a data processing system.

In a similar fashion, information characters may be received in parallel, transferred to the shift registers of each channel and subsequently serially written into the three zones of the disk. Control circuitry determines when each byte of a character has been received by the shift registers and, when all of the shift registers have been so loaded, enables the remote unit to present the next character on its output lines.

In another embodiment, an additional buffer is included in each channel. During a read operation, bytes transferred from the shift registers are alternately transferred to the first and second buffers of each channel. The contents of one or the other of the buffers is always presented to the remote unit. Similarly, during a write operation, bytes are transferred from the remote unit into alternate ones of the two buffers in each channel. In this embodiment, the remote unit need not accept information presented to it during a read operation, nor change information on its output lines after acceptance of information by the shift register during a write operation, within as short a period of time as is required by the first embodiment.

Figure 2A:
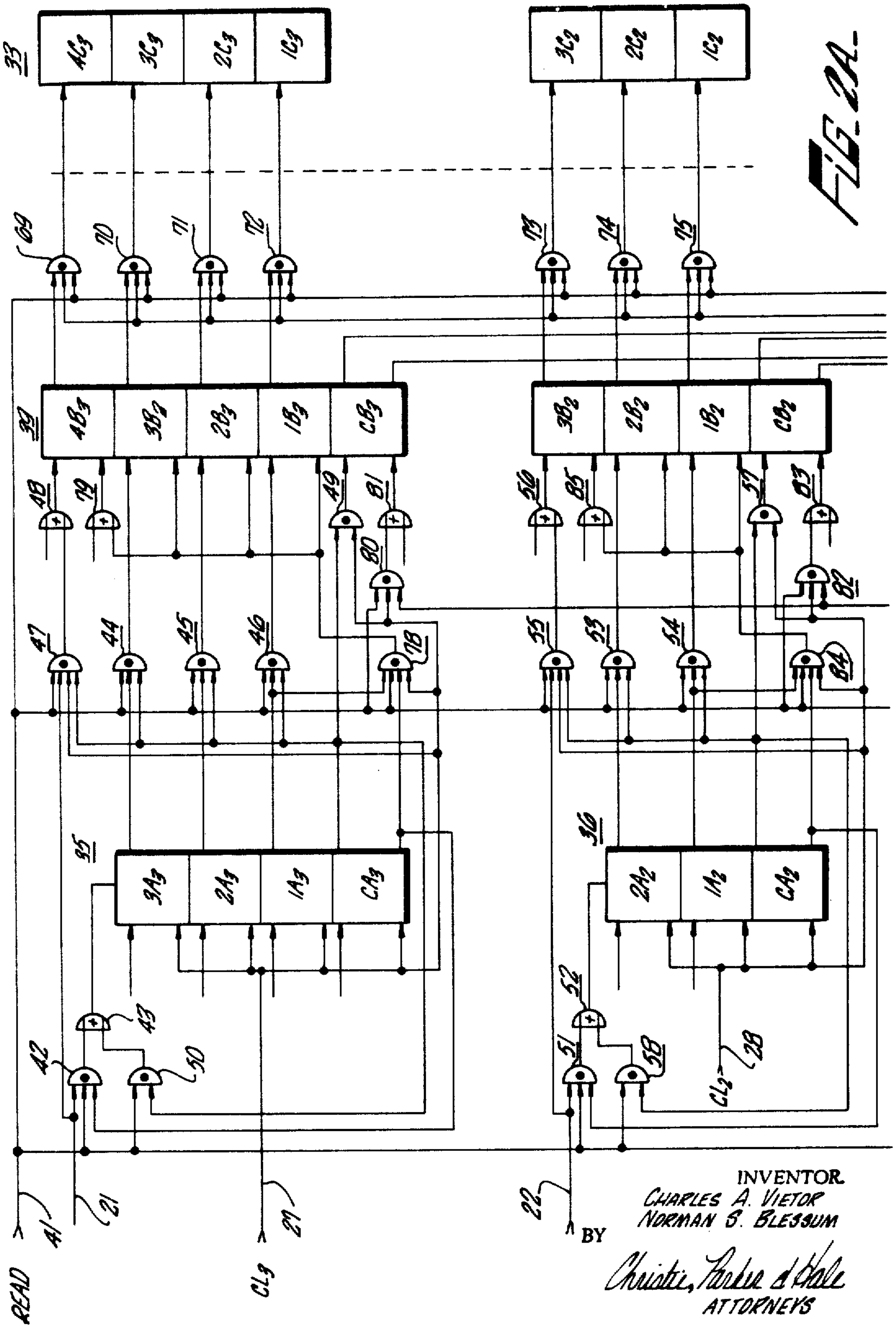
Figure 2B:
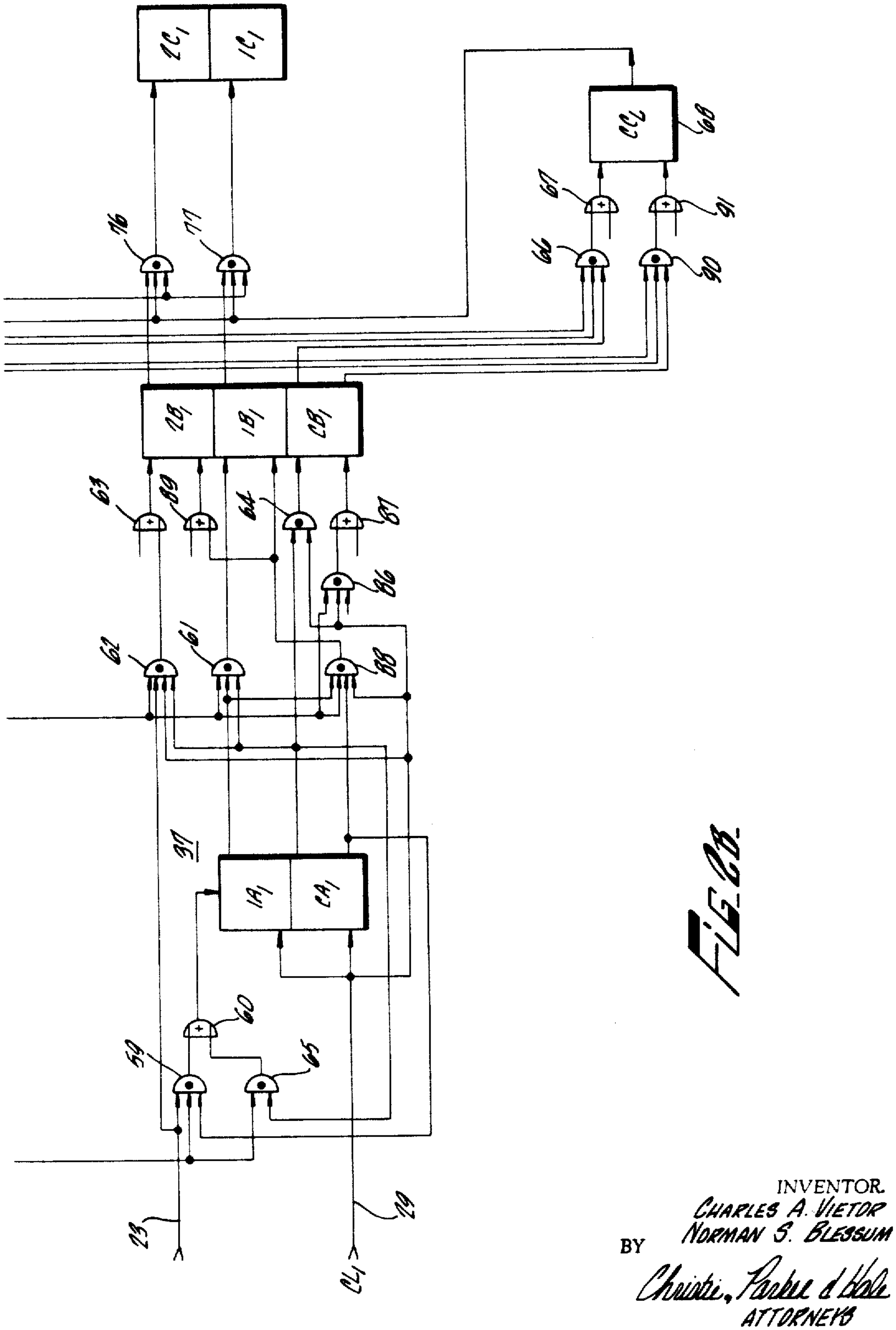
Figure 3:
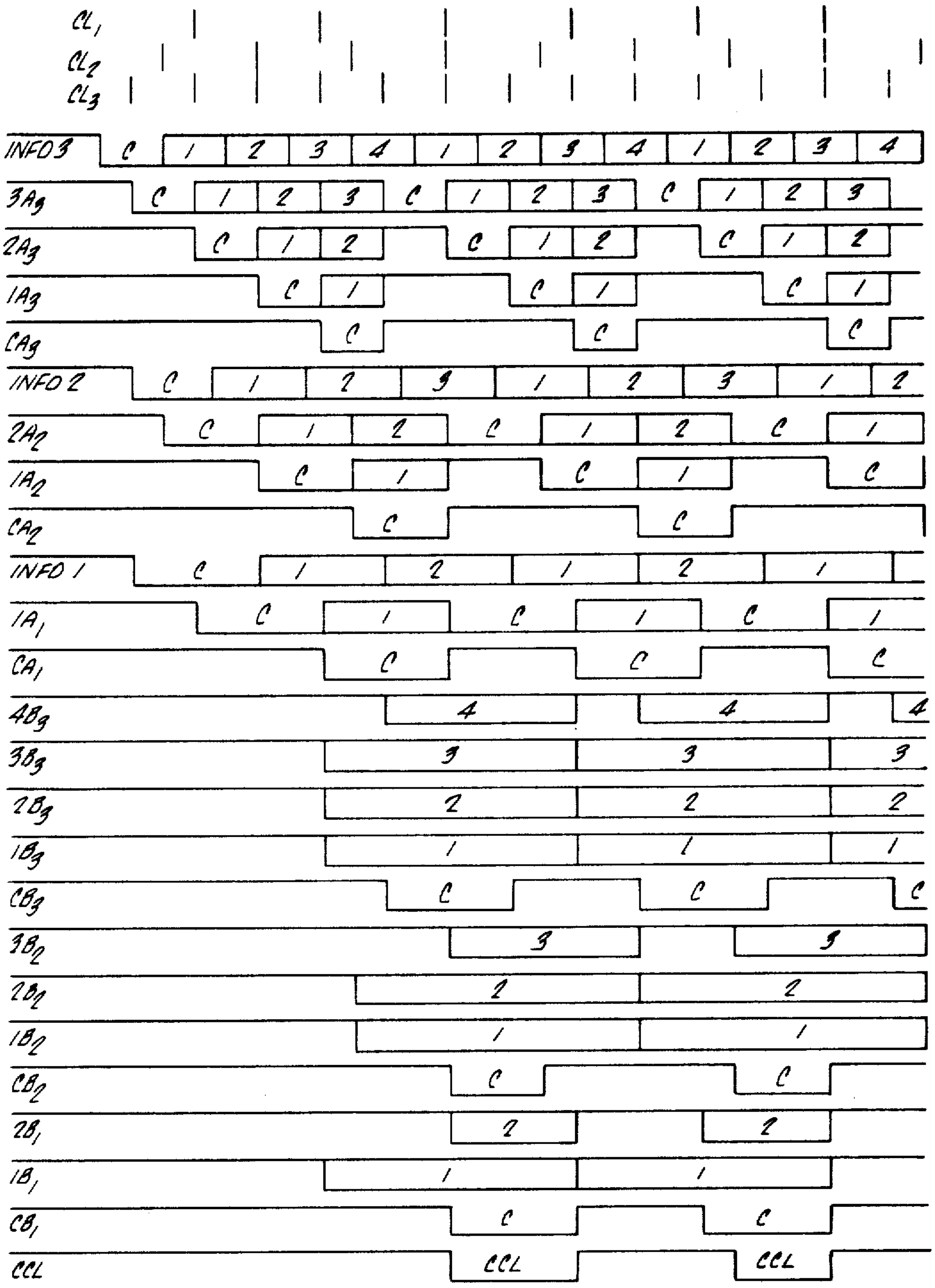
Figure 4A:
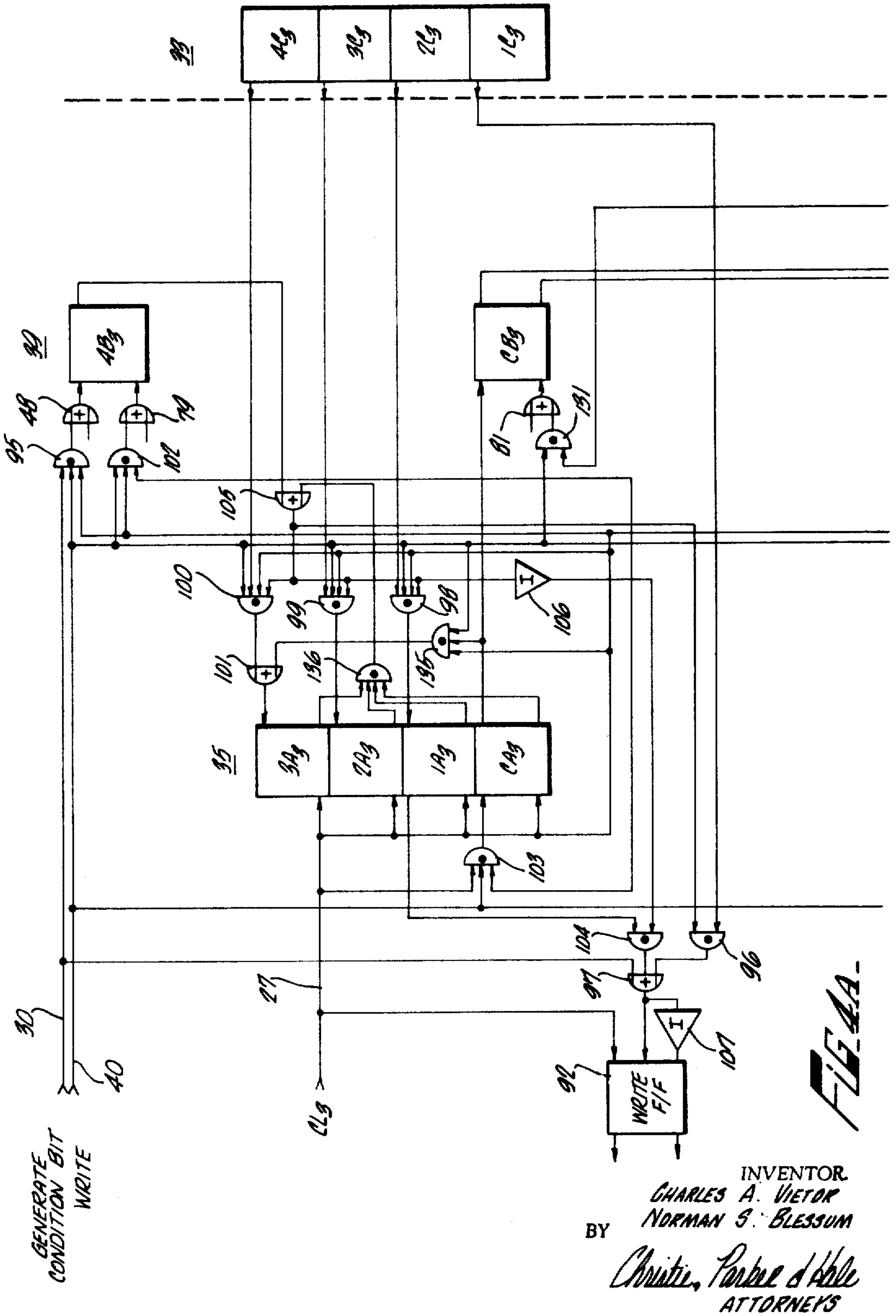
Figure 4B:
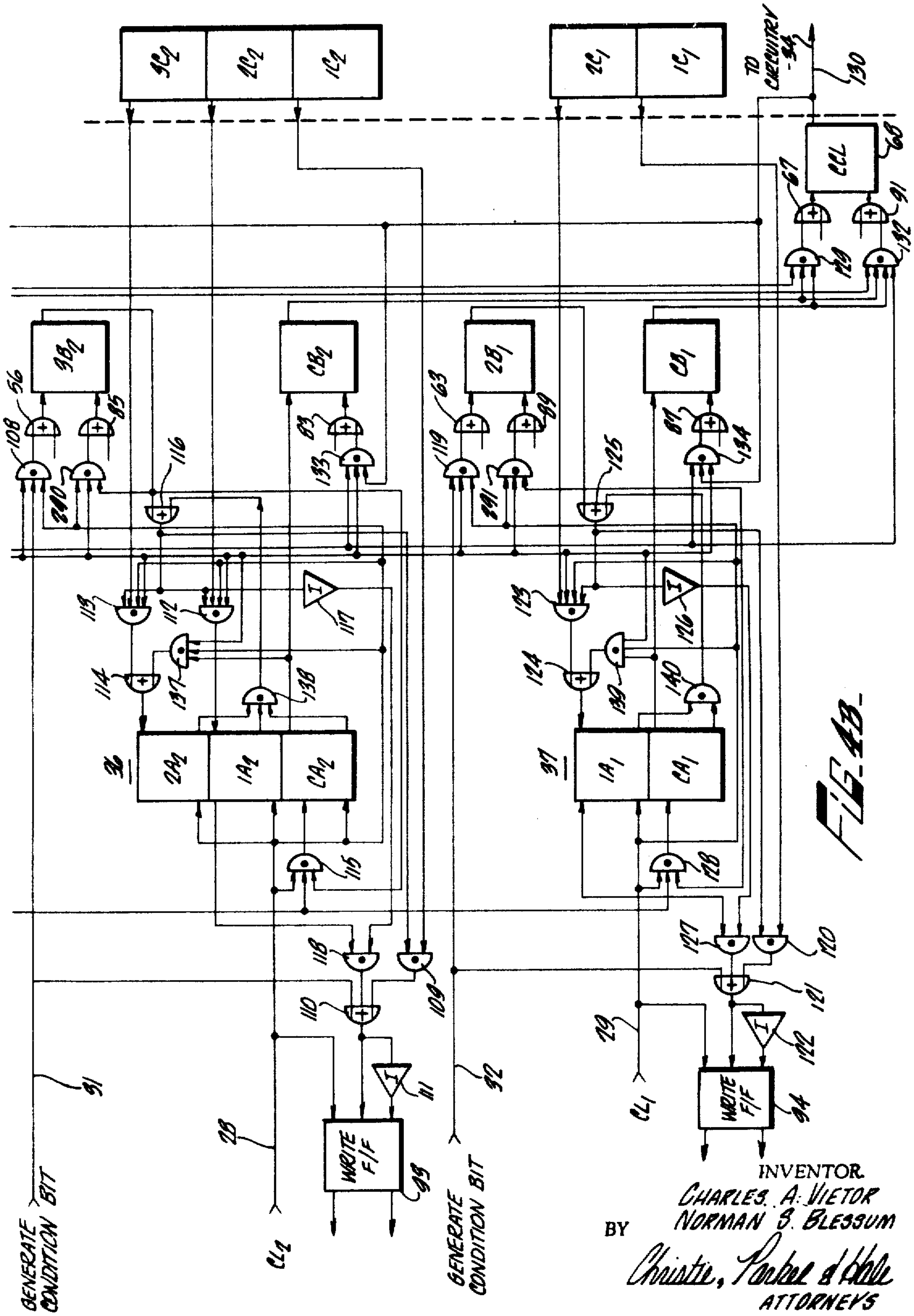
Figure 5:
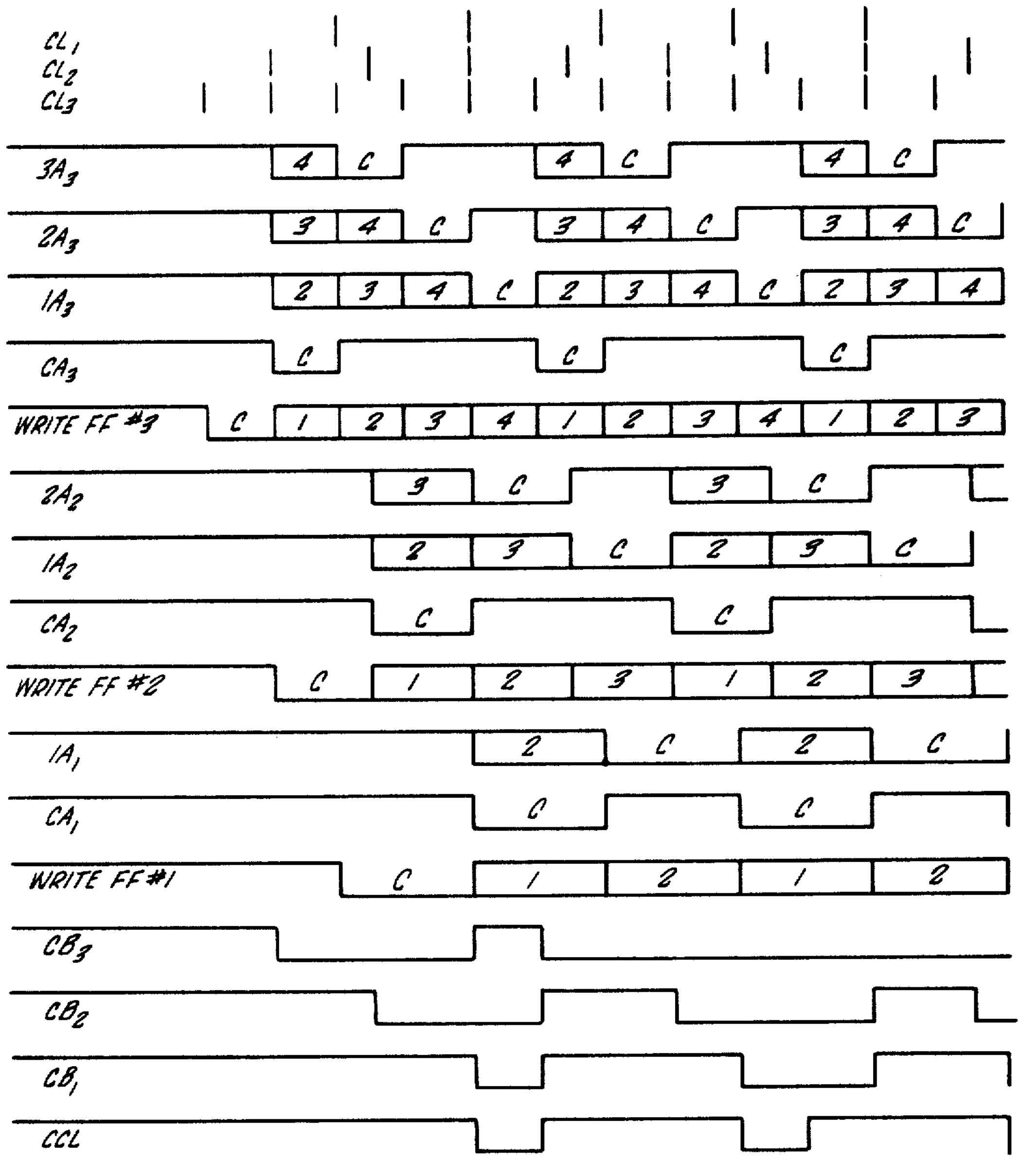
Figure 6A:
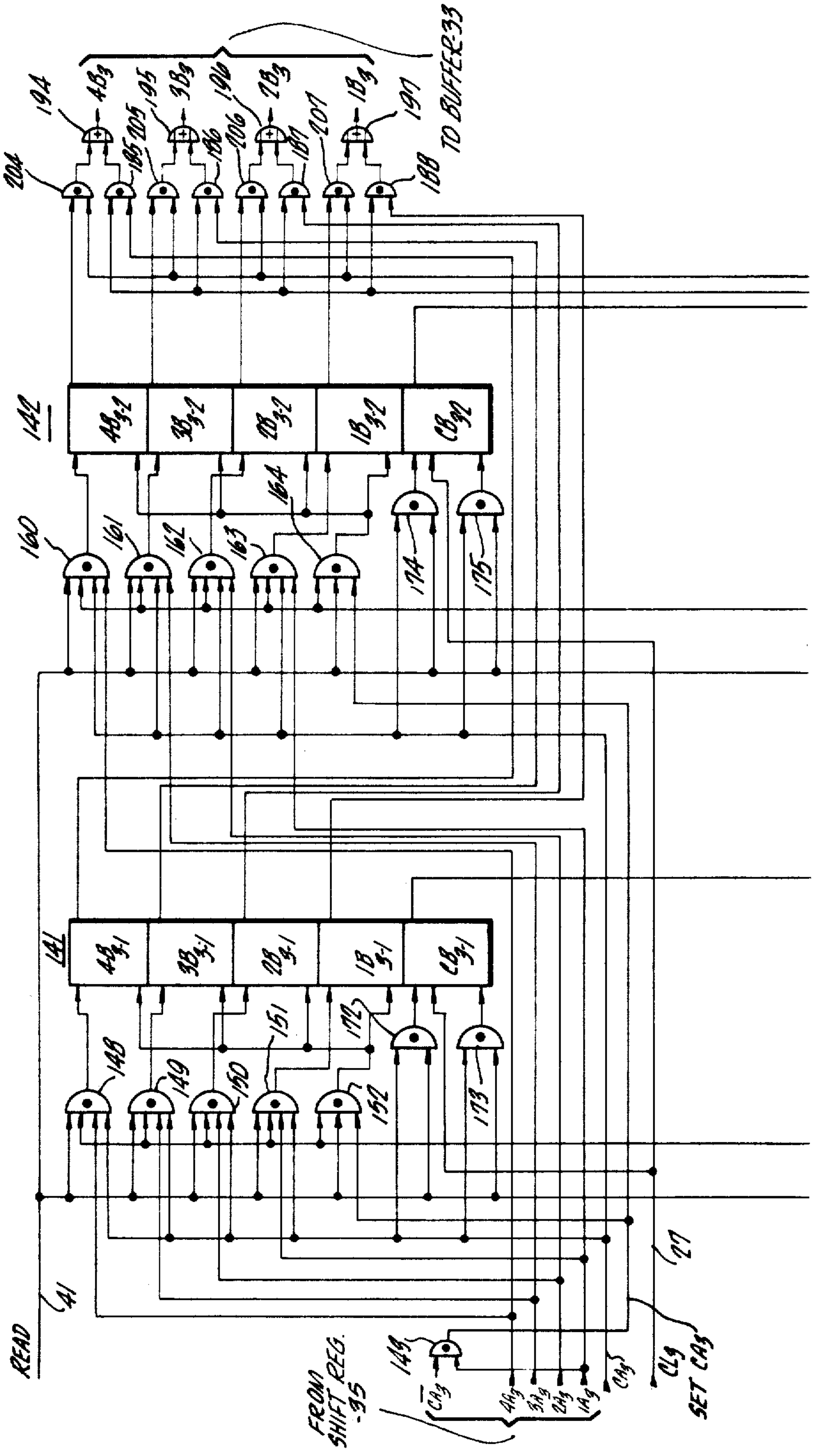
Figure 6B:
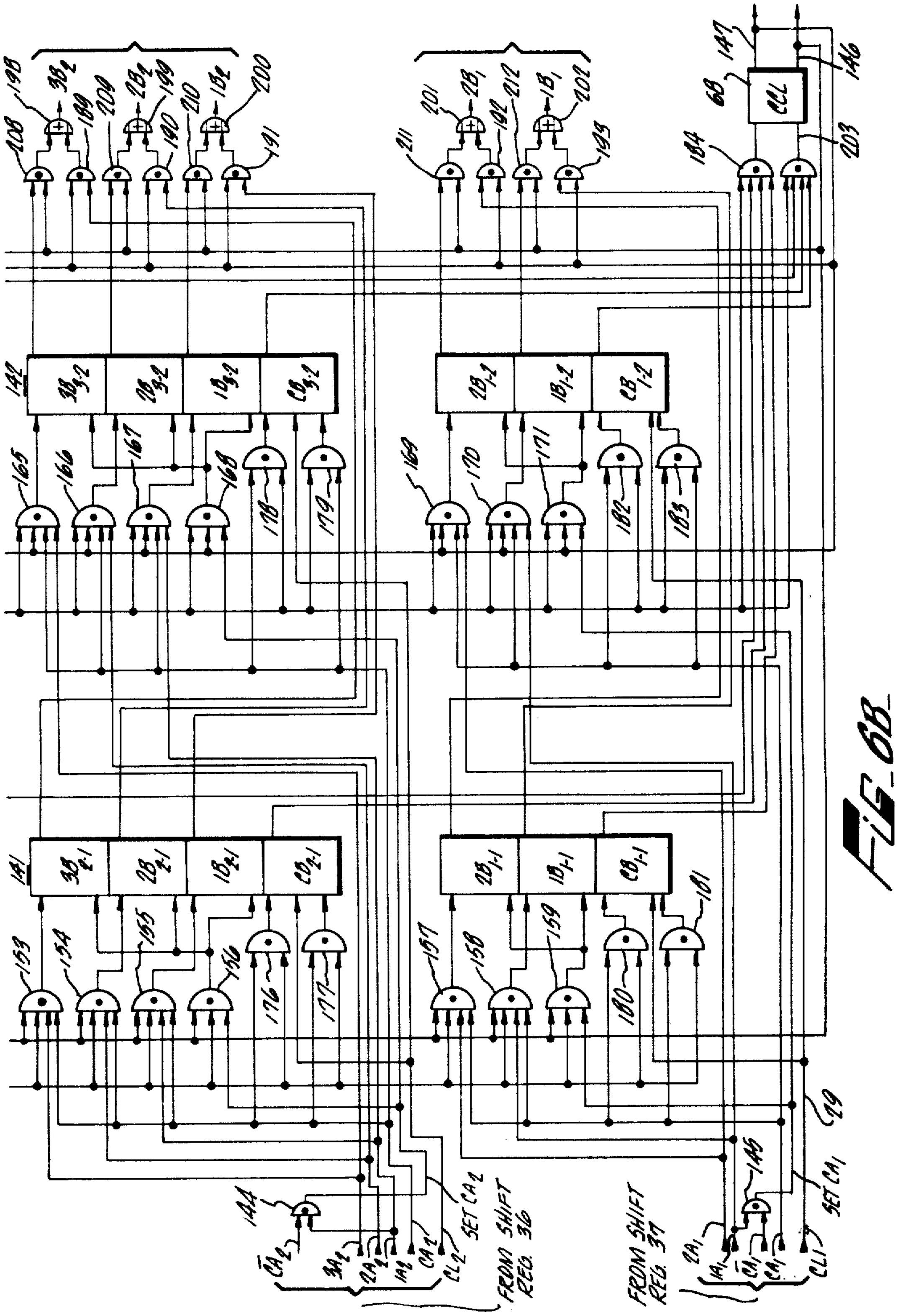
Figure 7A:
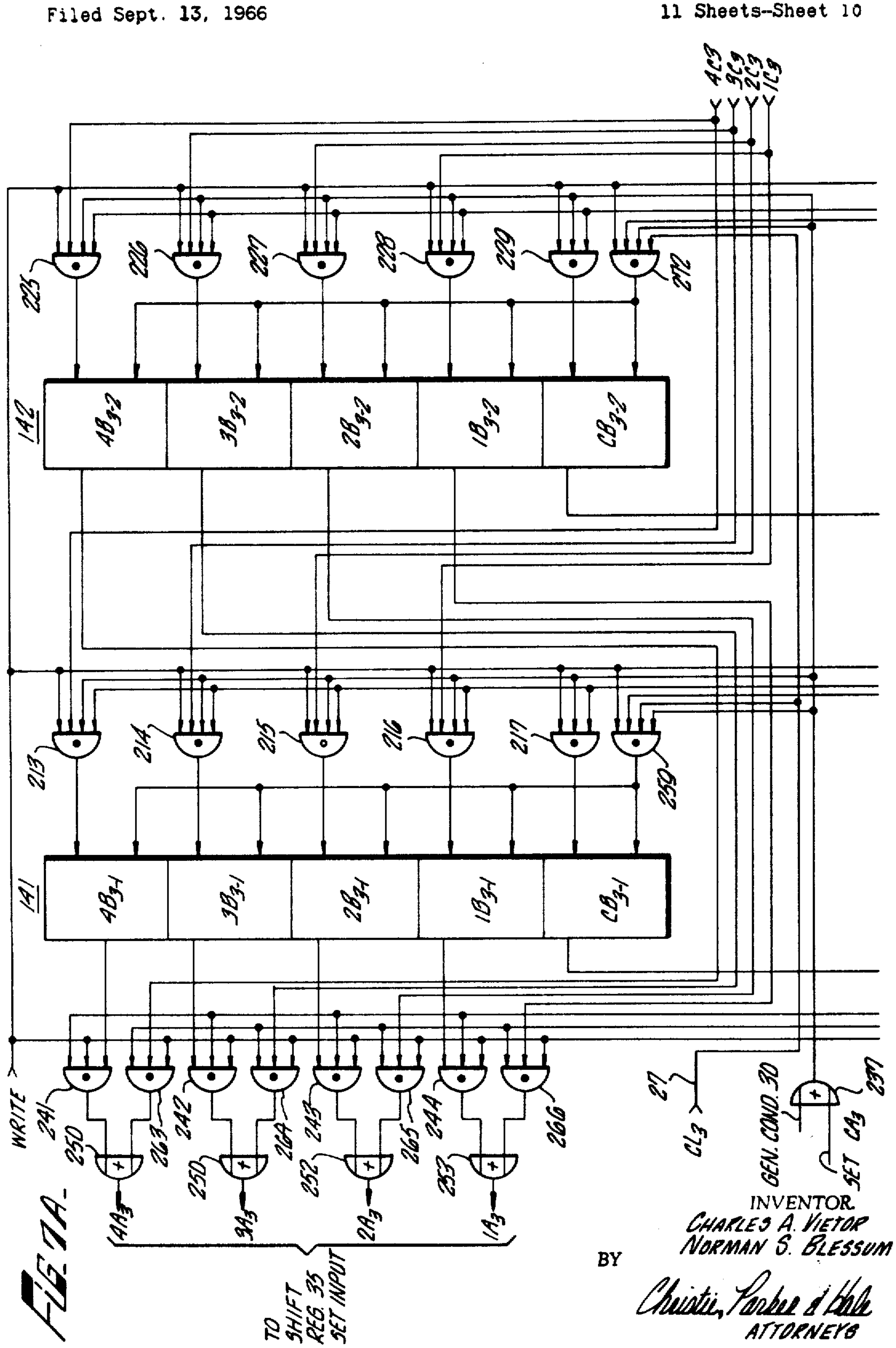
Figure 7B:
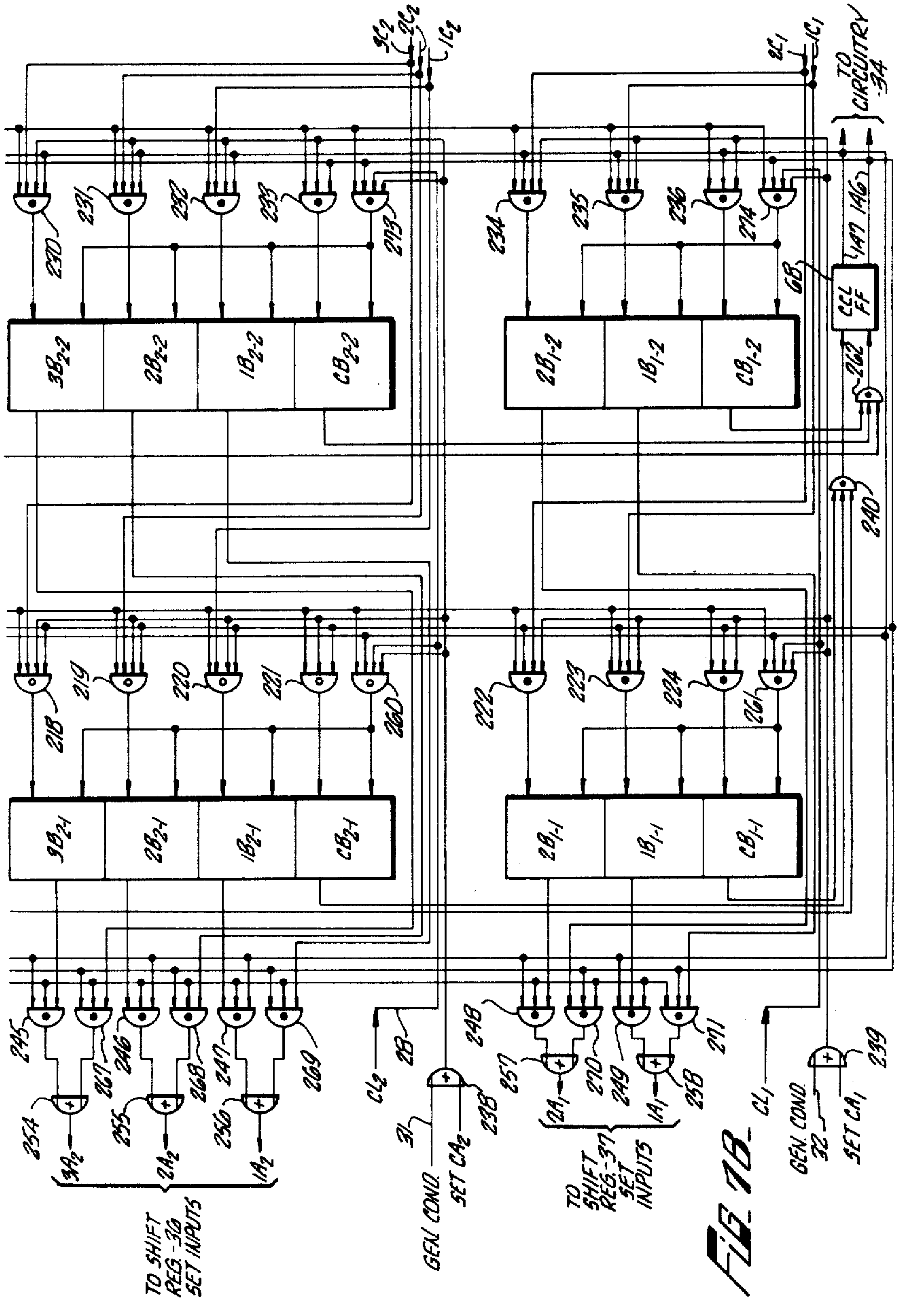

The manner of operation of the present invention and the manner in which it achieves the above and other advantages may be more clearly understood by reference to the following detailed description when considered with the drawing in which:

FIG. 1 depicts a block diagram illustrating a basic form of the present invention;

FIG. 2, which comprises FIG. 2A positioned above FIG. 2B, depicts an embodiment of the present invention including control circuitry utilized during a read operation;

FIG. 3 depicts a timing diagram illustrating signals generated during the read operation of the embodiment of FIG. 2;

FIG. 4, which comprises FIG. 4A positioned above FIG. 4B, depicts the embodiment of FIG. 2 including control circuitry utilized during a write operation;

FIG. 5 depicts a timing diagram illustrating sgnals generated durng the write operation of the embodiment of FIG. 4;

FIG. 6, which comprises FIG. 6A positioned above FIG. 6B, depicts an embodiment of the present invention utilizing two buffers between the shift registers and remote unit of the embodiment shown in FIG. 2 together with control circuitry used during a read operation; and FIG. 7, which comprises FIG. 7A positioned above FIG. 7B, depicts the embodiment of FIG. 6 including control circuitry utilized during a write operation.

FIG. 1 depicts a block diagram illustrating a basic form of the present invention. Magnetic disk file 11 is shown having three information storage zones 12, 13 and 14 thereon. Information in binary digit form is stored in each of the three information zones. Higher packing density may be achieved by utilizing different frequencies for the bit repetition rate in each of the three zones 12, 13 and 14. Thus, for example, bit repetition frequencies of 1 megacycle, 1.5 megacycles and 2 megacycles may be utilized with respect to three zones 12, 13 and 14, respectively. An additional master clock and master address zone 15 is also provided. For a given rotational movement of disk 11 four bit locations will pass under the read-write head 16 in zone 14; three bit locations will pass under the read-write head 17 in zone 13; and two bit locations will pass under the read-write head 18 in zone 12. Clock signals permanently recorded in zone 15 pass under head 19. Binary information signals to be recorded on disk 11 are received by the heads from read-write control circuitry 20. Circuitry 20 also receives from the heads binary signals which are read from disk 11.

During a read operation the control circuitry 20 presents on lines 21, 22 and 23 information signals from zones 14, 13 and 12, respectively. During a write operation the control circuitry receives binary signals on lines 24, 25 and 26 and records these signals on zones 14, 13 and 12, respectively. During both read and write operations, control circuitry 20 provides a 2 megacycle clock signal on line 27; a 1.5 megacycle on line 28 and a 1 megacycle clock signal on line 29. The operation of disk 11 in conjunction with control circuitry 20 and their associated circuitry is described in detail in the copending application of Richard C. Simonsen, Norman S. Blessum and John A. Hibner, Ser. No. 579,119, assigned to the assignee of the present application and filed on even date herewith. This copending application may be considered incorporated by reference herein.

Each segment of binary signals recorded on the zones 12, 13 and 14 is preceded by a binary "1" which is utilized as a conditioning bit. At the commencement of a write operation, conditioning bits to be stored in the zones 12, 13 and 14 are generated on lines 30, 31 and 32 and subsequently stored in the respective zones of disk 11. The generation of these conditioning bits is described in the aforesaid copending application.

FIG. 1 also depicts control unit buffer circuitry 33 and control unit logic circuitry 34. Circuitry 33 and 34 comprise part of a remote unit which presents data characters which are to be written into disk 11 and which receives and stores data characters read from disk 11. These information characters are advantageously divided into three bytes. Each byte of an information character is stored in a different one of the three zones of disk 11. The byte stored in zone 14 may advantageously comprise four bits; the byte stored in zone 13, three bits and the byte stored in zone 12, two bits. The reading of bytes from each of the three zones and the writing of bytes into each of these zones proceed independently of the reading and writing, respectively, of bytes from and into the other zones. These operations may be considered to occur in three separate and independent channels. Because of phase differences between the transfers occurring in these three channels, bytes of each information character are transferred asynchronously. Transfers of these bytes to and from the control unit, however, must be made synchronously.

The present invention achieves such synchronization of these asynchronous bytes. Thus, during a read operation, bits from the three zones are shifted serially into shift registers 35, 36 and 37. Control circuitry 38 determines whenever any of the registers 35, 36 and 37 has been fully loaded with a complete byte and, upon such determination, the byte is transferred to buffer circuitry 39. Control circuitry 38 also determines when buffer circuitry 39 has been fully loaded with bytes from all three shift registers and, upon such determination, enables the bytes of an entire character to be synchronously transferred to buffer circuitry 33 of the control unit.

Similarly, during a write operation information characters are transferred from the control unit to the shift registers and each byte is subsequently serially written into the proper zone of disk 11. Control circuitry 38 enables each of the shift registers 35, 36 and 37 to receive a byte of a succeeding character after the byte of a preceding character has been serially transferred to disk 11. Control circuitry 38 also determines when a complete character has been accepted by the register 35, 36 and 37 and, upon such determination, enables the control unit to present the bytes of the next character to the electronic unit.

Each write or read operation is initially instituted as a result of a signal to control circuitry 20 from control unit logic circuitry 34 indicating that the control unit is either ready to receive information characters from the disk 11 or to store information characters onto disk 11. Thus, an indication that a write operation is to be performed may be indicated by a signal on line 40 and an indication that a read indication is to be performed may be indicated by a signal on line 41.

FIG. 2 depicts an embodiment of the present invention which includes control circuitry utilized during a read operation. Additionally, FIG. 3 depicts a timing diagram illustrating signals generated during the read operation of the embodiment depicted in FIG. 2. FIG. 2 depicts the three channels of information received from disk 11 and control circuitry 20 of FIG. 1. Thus, information in the highest frequency channel is received over line 21, information in the intermediate frequency channel is received over line 22 and information in the lowest frequency channel is received over line 23. The clock signals associated with the three channels are received over lines 27, 28 and 29, respectively. Two megacycle clock signals $CL_3$ are transmitted over line 27, 1.5 megacycle clock signals $CL_2$ are transmitted over line 28 and 1 megacycle clock signal $CL_1$ is transmitted over line 29. FIG. 2 also depicts shift registers 35, 36 and 37, electronic unit buffer 39 and control unit buffer 33, also shown in FIG. 1.

Shift register 35 comprises four flip-flop circuits designated $3A_3$, $2A_3$, $1A_3$ and $CA_3$. Similarly, shift register 36 comprises three flip-flop circuits designated $2A_2$, $1A_2$ and $CA_2$ and shift register 37 comprises two flip-flop circuits designated $1A_1$ and $CA_1$. The buffer circuitry 39 is divided into three segments which are associated with respective ones of the shift registers 35 through 37. The segment of buffer 39 associated with register 35 comprises flip-flops designated $4B_3$, $3B_3$, $2B_3$, $1B_3$ and $CB_3$. The segment associated with register 36 comprises flip-flops designated $3B_2$, $2B_2$, $1B_2$ and $CB_2$, while the segment associated with register 37 comprises flip-flops designated $2B_1$, $1B_1$ and $CB_1$. In a similar fashion the buffer circuitry 33 has three segments the first of which comprises flip-flops designated $4C_3$, $3C_3$, $2C_3$ and $1C_3$, the second of which comprises flip-flops designated $3C_2$, $2C_2$ and $1C_2$ and the third of which comprises flip-flops designated $2C_1$ and $1C_1$. Each of the flip-flops described herein may advantageously be of the JCL type which has, in addition to the ordinary set and clear inputs, a clock input, a J input and a K input. A signal on a J input will set such a flip-flop only if a simultaneous signal is applied to its clock input and a signal on its K input will clear the flip-flop only if a simultaneous signal appears on its clock input. Additionally, internal cross-coupling in such flip-flops causes them to switch to their opposite state whenever signals are simultaneously applied to their J, K and clock inputs.

A read operation is initiated by means of a signal from the control unit to control circuitry 20 of FIG. 1 indicating that the control unit is ready to receive a segment of information characters from disk 11. During the entire read operation a signal is present on "Read" line 41 shown in FIG. 2. Line 41 shown in FIG. 2 may be identical to line 41 shown in FIG. 1 or may advantageously be a separate line energized by control circuitry 20 in response to the signal presented to it by control unit logic circuitry 34 over line 41.

The initial bit read from each of the three zones of disk 11 will be a conditioning bit. The transfers which occur in each of the three channels shown in FIG. 2 are similar and attention will be directed primarily to those which occur in the highest frequency channel. In response to a first clock signal $CL_3$ appearing on line 27, a conditioning bit received over line 21 will be transferred via gates 42 and 43 into flip-flop $3A_3$ of register 35. This transfer and subsequent transfers are depicted in FIG. 3. Subsequent to its insertion in flip-flop $3A_3$, the conditioning bit operates to control subsequent transfers of information and will henceforth be referred to as a control bit.

As second clock signal $CL_3$ appearing on line 27 clocks the control bit into flip-flop $2A_3$ and clocks a first information bit transmitted over line 21 into flip-flop $3A_3$.

A third clock signal $CL_3$ clocks the control bit into flip-flop $1A_3$, clocks the first information bit into flip-flop $2A_3$ and clocks a second information bit into flip-flop $3A_3$.

A fourth clock signal $CL_3$ clocks the control bit into flip-flop $CA_3$, clocks the first information into flip-flop $1A_3$, the second information bit into flip-flop $2A_3$ and a third information bit into flip-flop $3A_3$. The transfer of the control bit into flip-flop $CA_3$ switches this flip-flop from its cleared to its set condition. By previously being in its cleared position, flip-flop $CA_3$ had enabled the conditioning bit and first three information bits to be transferred via gate 42 from line 21 into flip-flop $3A_3$. Upon the control bit being transferred into $CA_3$, however, this flip-flop is switched to its set condition and gate 42 is disabled from passing information from line 21 to flip-flop $3A_3$. The setting of flip-flop $CA_3$ also causes the information bits stored in flip-flop $3A_3$, $2A_3$ and $1A_3$ to be transferred via gates 44, 45 and 46, respectively, into flip-flops $3B_3$, $2B_3$ and $1B_3$, respectively, of electronic unit buffer 39.

A fifth clock signal $CL_3$ clocks a fourth information bit appearing on information line 21 into flip-flop $4B_3$ of buffer 39 via gates 47 and 48. Gate 47 is enabled by reason of the control bit being in flip-flop $CA_3$. Thus, the presence of the control bit in $CA_3$ both prevents the fourth information bit from being stored into flip-flop $3A_3$ and causes it to be stored in flip-flop $4B_3$. The fifth clock signal also shifts the control bit from flip-flop $CA_3$ into flip-flop $3A_3$ via gates 50 and 43 and clears flip-flops $2A_3$, $1A_3$ and $CA_3$. The fifth clock signal also clocks the control bit from flip-flop $CA_3$ into flip-flop $CB_3$ via gate 49. Thus, subsequent to the appearance of the fifth clock signal, all four information bits of the byte being transferred via the high frequency channel are stored in flip-flops $4B_3$, $3B_3$, $2B_3$ and $1B_3$ of buffer 39 and a control bit is stored in $CB_3$ of buffer 39 and in flip-flop $3A_3$ of shift register 35. With respect to the setting and clearing of the flip-flops shown in FIG. 2, the upper input line of each flip-flop will set the flip-flop while a signal on the lower input line will clear it. Similarly, a signal is present on the upper output line of each flip-flop when the flip-flop is in the set condition and a signal is present on the lower output line of each flip-flop when the flip-flop is in the cleared condition. Input lines to certain of the flip-flops and gates of FIG. 2 are shown for illustrative purposes to be unconnected and represent lines which are utilized in the write operation of this embodiment to be discussed hereinafter.

Information is transmitted over the intermediate frequency channel in a manner similar to that just described for the high frequency channel. Thus, the initial conditioning bit and subsequent information bits are shifted into shift register 36 over line 22 via gates 51 and 52. The subsequent shift of the control bit into flip-flop $CA_2$ effects a transfer of information bits from flip-flops $2A_2$ and $1A_2$ via gates 53 and 54 into flip-flops $2B_2$ and $1B_2$, respectively. A subsequent clock signal $CL_2$ on line 28 then transfers a third information bit from line 22 into flip-flop $3B_2$ via gates 55 and 56, transfers the control bit from flip-flop $CA_2$ to flip-flop $CB_2$ via gate 57, transfers the control bit from flip-flop $CA_2$ to flip-flop $2A_2$ via gates 58 and 52 and clears flip-flops $1A_2$ and $CA_2$.

Transfers occur in the low frequency channel in a similar fashion. Initially, a conditioning bit and first information bit are transferred from line 23 via gates 59 and 60 to shift register 37. The shifting of the control bit into flip-flop $CA_1$ effects a transfer of the first bit from flip-flop $1A_1$ via gate 61 into flip-flop $1B_1$. A subsequent clock signal $CL_1$ on line 29 effects a transfer of a second information bit from line 23 via gates 62 and 63 into flip-flop $2B_1$, effects a transfer of the control bit from flip-flop $CA_1$ via gate 64 to flip-flop $CB_1$, shifts the control bit from flip-flop $CA_1$ to flip-flop $1A_1$ via gates 65 and 60 and clears flip-flop $CA_1$.

Thus, it may be seen that upon the transfer of a complete byte to any segment of buffer 39 the CB flip-flop of the segment will have a control bit stored therein. When all three of the segments have complete bytes stored therein, the flip-flops $CB_3$, $CB_2$ and $CB_1$ will be in the set condition and the coincidence of these three flip-flops being in the set condition will transfer signals via gates 66 and 67 and cause character clock (CCL) flip-flop 68 to switch to the set condition. The setting of CCL flip-flop 68 then effects the synchronous transfer of a complete character of information from buffer 39 to control unit buffer 33. Thus, the setting of CCL flip-flop 68 causes the contents of flip-flop $4B_3$ to be transferred to flip-flop $4C_3$ via gate 69, the contents of $3B_3$ to be transferred to flip-flop $3C_3$ via gate 70, the contents of flip-flop $2B_3$ to $2C_3$ via gate 71, $1B_3$ to $1C_3$ via gate 72, $3B_2$ to $3C_2$ via gate 73, $2B_2$ to $2C_2$ via gate 74, $1B_2$ to $1C_2$ via gate 75, $2B_1$ to $2C_1$ via gate 76 and $1B_1$ to $1C_1$ via gate 77.

The serial transfer of bits of a second character into shift registers 35, 36 and 37 proceeds independently of the transfer of the first character from buffer 39 to control unit buffer 33. Thus, with respect again to the high frequency channel, a sixth clock signal shifts the control bit into flip-flop $2A_3$ and clocks the first information bit of the second byte into flip-flop $3A_3$ via gates 42 and 43.

Similarly, a seventh clock signal clocks the control bit into $1A_3$, the first information bit into flip-flop $2A_3$ and a second information bit into $3A_3$.

An eighth clock signal shifts the control bit into flip-flop $CA_3$, the first information bit into $1A_3$, the second information bit into $2A_3$ and a third information bit into flip-flop $3A_3$. The eighth clock signal also effects a clearing of flip-flops $4B_3$, $3B_3$, $2B_3$ and $1B_3$ by signals applied to these flip-flops via gates 78 and 79.

Subsequent to the setting of CCL flip-flop 68 and the transfer of the first byte of information from flip-flops $4B_3$, $3B_3$, $2B_3$ and $1B_3$ to control unit buffer 33, flip-flop $CB_3$ was cleared by the first clock pulse $CL_3$ which occurred subsequent to the setting of CCL flip-flop 68. As shown in FIG. 3, this was the seventh clock pulse $CL_3$. Flip-flop $CB_3$ was cleared by the seventh clock signal via gates 80 and 81. The eighth clock signal in addition to clearing flip-flops $4B_3$, $3B_3$, $2B_3$ and $1B_3$ also shifts the control bit into flip-flop $CA_3$. As a result of the control bit again being in flip-flop $CA_3$, the information bits of the second byte now stored in flip-flops $3A_3$, $2A_3$ and $1A_3$ are again transferred to flip-flops $3B_3$, $2B_3$ and $1B_3$ just as occurred subsequent to the shift of the control bit into $CA_3$ by the fourth clock signal. Thus, it may be seen that the shift of information to shift register 35 and its subsequent transfer to the segment of buffer 39 associated with register 35 occurs continuously with the shift from register 35 to buffer 39 occurring in response to each fourth clock signal $CL_3$ appearing on line 27.

In a similar manner, information shifted into register 36 of the intermediate frequency channel is shifted to the segment of buffer 39 associated with register 36 by each third clock signal $CL_2$ appearing on line 28 and information shifted into the shift register 37 of the low frequency channel is transferred into the portion of buffer 39 associated with register 37 by every second clock signal $CL_1$ appearing on line 29. With respect to the intermediate channel, flip-flop $CB_2$ is cleared via gates 82 and 83 by the first clock signal $CL_2$ appearing on line 28 subsequent to the setting of CCL flip-flop 68. Flip-flop $3B_2$, $2B_2$ and $1B_2$ are cleared via gates 84 and 85 by the clock signal which shifts the control bit from flip-flop $1A_2$ to flip-flop $CA_2$. Similarly, with respect to the low frequency channel flip-flop $CB_1$ is cleared via gates 86 and 87 by the first clock signal $CL_1$ appearing on line 29 subsequent to the setting of CCL flip-flop 68. The flip-flop $2B_1$ and $1B_1$ are cleared via gates 88 and 89 by the same clock signal which shifts the control bit from flip-flop $1A_1$ to flip-flop $CA_1$. Upon the clearing of all three of the flip-flops $CB_3$, $CB_2$ and $CB_1$, CCL flip-flop 68 is cleared via gates 90 and 91.

Thus, it may be seen that during a read operation, as shown in FIG. 2, transfers into the shift registers 35, 36 and 37 occur asynchronously and continually. The initial bit transferred into each of these registers is a conditioning bit which subsequently recirculates within the register as a control bit which governs the transfers of bytes from the registers to their associated sections of buffer 39. The control bits also serve to synchronize the transfer to buffer 33 of bytes stored in the three sections of buffer

39. The transfer of information from the disk file over the three channels, the transfer of accumulated bytes to the buffer register and the synchronous transfer of characters to the control unit may thus proceed on a continuous basis with the asynchronously received bytes of each character being advantageously synchronized by means of the circuitry depicted in FIG. 2 and thence synchronously transferred to control unit buffer.

FIG. 4 depicts the embodiment of the present invention shown in FIG. 2, including control circuitry utilized during a write operation. FIG. 5 depicts a timing diagram illustrating signals generated during the write operation of the embodiment of FIG. 4. FIG. 5 may conveniently be referred to during the following discussion of the write operation illustrated in FIG. 4.

When the remote unit is ready to commence a write operation, a signal is transmitted by it to the read-write control circuitry 20 shown in FIG. 1. During a write operation, a signal is continually present on "Write" line 40 shown in FIG. 4. The signal appearing on "Write" line 40 may advantageously be the complement of the "Read" signal applied to line 41 in FIG. 2.

Upon the commencement of a write operation, a condition bit for each of the channels is generated by the control circuitry 20 of FIG. 1. Thus, at the commencement of a write operation a condition bit for the high frequency channel appears on line 30, a condition bit for the intermediate channel appears on line 31 and a condition bit for the low frequency channel appears on line 32. Attention again will be directed primarily to the operation of the high frequency channel.

At the time of a first clock signal $CL_3$ applied to line 27, the condition bit is clocked directly into write flip-flop 92. Similarly, at the time of first clock pulses in their respective channels condition bits are clocked into write flip-flop 93 of the intermediate frequency channel and write flip-flop 94 of the low frequency channel. In response to the first clock signal $CL_3$, the condition bit is also clocked into flip-flop $4B_3$ of buffer via gates 95 and 48. The condition bit clocked into flip-flop $4B_3$ thereafter operates to control transfers of information bits and will hereafter be referred to as a control bit.

At this time, control unit buffer 33 is storing the first information character to be written into the disk file. The contents of buffer 33 are presented on the output lines of the flip-flop circuits which comprise buffer 33. The write flip-flops 92, 93 and 94 present signals on their output lines which are written into zones 12, 13 and 14 of magnetic disk 11 shown in FIG. 1 in a manner described in the copending application of Simonsen and Blessum, referred to hereinbefore.

At the time of a second clock signal $CL_3$ appearing on line 27, a first information bit stored in flip-flop $1C_3$ of buffer 33 is clocked into write flip-flop via gates 96 and 97. The second clock signal $CL_3$ also effects a transfer of a second information bit from flip-flop $2C_3$ of buffer to flip-flop $1A_3$ of register 35 via gate 98, a transfer of a third information bit from flip-flop $3C_3$ to flip-flop $2A_3$ via gate 99 and a transfer of a fourth information bit from flip-flop $4C_3$ to flip-flop $3A_3$ via gates 100 and 101. Also in response to the second clock signal $CL_3$, flip-flop $4B_3$ is cleared via gates 102 and 79 and the control bit stored in flip-flop $4B_3$ is transferred to flip-flop $CA_3$ via gate 103. No transfer occurs between flip-flop $1A_3$ and write flip-flop 92 via gate 104 at the time of the second clock signal $CL_3$, since gate 104 is disable at this time. It is disabled by reason of the fact that gate 105 passes a "true" signal from flip-flop $4B_3$ which is inverted to a "false" signal by inverter 106, thereby disabling gate 104. The first information bit from $1C_3$ transferred to write flip-flop 92 in response to the second clock signal $CL_3$ causes flip-flop 92 to remain in a set condition if this bit is a "1" and clears the write flip-flop 92 if this information bit is a "0." The clearing of flip-flop 92 is effected by reason of a signal presented to the "clocked-clear"

input of flip-flop 92 via inverter 107 whenever a "0" is presented to gate 97 at any clock time. Subsequent to the insertion of the control bit in flip-flop $CA_3$ by the second clock signal $CL_3$, and unclocked transfer of this control bit to flip-flop $CB_3$ occurs, thereby setting flip-flop $CB_3$ The setting of flip-flop $CB_3$ indicates that the byte of information bits presented by the portion of control unit buffer 33 associated with the high frequency channel has been accepted by shift register 35.

Shift registers 36 and 37 receive information bits from the portions of buffer 33 associated with these channels in a manner similar to that described for the high frequency channel. Thus, with respect to the intermediate frequency channel, a first clock signal $CL_2$ on line 28 causes a control bit to be inserted in flip-flop $3B_2$ via gates 108 and 56. Similarly, in response to a second clock signal $CL_2$ information from flip-flops $1C_2$, $2C_2$ and $3C_2$ of buffer 33 are transferred via gates 109, 110 and inverter 111 to write flip-flop 93, via gate 112 to flip-flop $1A_2$ and via gates 113 and 114 to flip-flop $2A_2$, respectively. Similarly, in response to the second clock pulse $CL_2$, the control bit in flip-flop $3B_2$ is transferred to flip-flop $CA_2$ via gate 115. Similarly, gate 116 and inverter 117 prevent the transfer of the contents of flip-flop $1A_2$ to write flip-flop 93 via gate 118 in response to the second clock signal $CL_2$. In a similar manner flip-flop $CB_2$ is set by an unclocked transfer of the control bit inserted in flip-flop $CA_2$ subsequent to the shift of the control bit into flip-flop $CA_2$.

The acceptance of information from flip-flop $1C_1$ and $2C_1$ by the lower frequency channel also occurs in a similar manner. Thus, in response to a first clock signal $CL_1$ appearing on line 29, a control bit is stored in flip-flop $2B_1$ via gates 119 and 63. A second clock signal $CL_1$ effects a transfer of a first information bit from flip-flop $1C_1$ to write flip-flop 94 via gates 120 and 121 and inverter 122. The second clock signal $CL_1$ also effects a transfer of a second information bit from flip-flop $2C_1$ to flip-flop $1A_1$ via gates 123 and 124. Similarly, gate 125 and inverter 126 prevents the transfer of information from flip-flop $1A_1$ to write flip-flop 94 via gate 127. The second clock signal $CL_1$ also effects a transfer of the control bit from flip-flop $2B_1$ to flip-flop $CA_1$ via gate 128. Subsequent to the insertion of the control bit in flip-flop $CA_1$, an unclocked transfer of the control bit from flip-flop $CA_1$ to flip-flop $CB_1$ occurs.

From the foregoing it may be seen that when all of the shift registers 35, 36 and 37 have accepted complete bytes of information from buffer 33, flip-flops $CB_3$, $CB_2$ and $CB_1$ will all be in the set condition. The coincidence of these flip-flops being in the set condition effects the setting of CCL flip-flop 68 via gates 129 and 67. The setting of CCL flip-flop 68 produces a signal on line 130 which is transmitted to the control unit logic circuitry 34 shown in FIG. 1. The presence of a signal on line 130 indicates to circuitry 34 that the first information character presented by the output lines of buffer 33 has now been accepted and that the control unit may now change the condition of these output lines by placing the second information character in buffer circuitry 33. Upon the setting of CCL flip-flop 68, an unclocked clearing of flip-flop $CB_3$ via gates 131 and 81 occurs. Upon the next clock signal $CL_3$ on line 27, CCL flip-flop 68 is cleared via a signal passed by gates 132 and 91, flip-flop $CB_2$ is cleared by a signal passed by gates 133 and 83 and flip-flop $CB_1$ is cleared by a signal passed by gates 134 and 87. Thus, CCL flip-flop 68 is set by the coincident setting of flip-flops $CB_3$, $CB_2$ and $CB_1$; flip-flop $CB_3$ is then cleared by the setting of flip-flop 68; and flip-flops $CB_2$, $CB_1$ and CCL are cleared by the first clock signal $CL_3$ which occurs following the setting of CCL flip-flop 68.

With respect once again to the transfer occurring in the highest frequency channel, a third clock signal $CL_3$ causes the second information bit to be clocked from flip-flop $1A_3$ to write flip-flop 92 via gates 104 and 97 and also causes the third information bit to be clocked into flip-flop $1A_3$ and the fourth information bit to be clocked into flip-flop $2A_3$. Additionally, the third clock signal $CL_3$ causes the control bit to be shifted from flip-flop $CA_3$ to flip-flop $3A_3$ via gates 135 and 101 and clears flip-flop $CA_3$.

A subsequent fourth clock signal $CL_3$ causes the third information bit to be clocked from flip-flop $1A_3$ to write flip-flop 92, causes the fourth information bit to be clocked from flip-flop $2A_3$ into flip-flop $1A_3$, causes the control bit to be clocked from flip-flop $3A_3$ to flip-flop $2A_3$ and clears flip-flop $2A_3$.

A subsequent fifth clock signal $CL_3$ causes the fourth information bit to be clocked from flip-flop $1A_3$ to write flip-flop 92, causes the control bit to be clocked from flip-flop $2A_3$ to flip-flop $1A_3$ and clears flip-flop $2A_3$. At this time, flip-flop $1A_3$ is the only one of the flip-flops of shift register 35 in the set condition. Consequently, gate 136 is enabled at this time.

A sixth clock signal $CL_3$ on line 27 then effects a transfer of a first information bit of a second character from flip-flop $1C_3$ of buffer 33 to write flip-flop 92. The sixth clock signal also effects a transfer of second, third and fourth information bits from flip-flops $2C_3$, $3C_3$ and $4C_3$, respectively, of buffer 33 to flip-flops $1A_3$, $2A_3$ and $3A_3$, respectively, of shift register 35. This transfer of information bits from the upper segment of buffer 33 to shift register 35 occurs by reason of the fact that gate 136 is enabled at this time and passes a signal via gate 105 to the gates 98, 99 and 100 which permit the transfer of information bits to shift register 35. Also in response to the sixth clock signal $CL_3$, the control bit is shifted from flip-flop $1A_3$ to flip-flop $CA_3$ and a subsequent unclocked transfer of the control bit to flip-flop $CB_3$ occurs. Again, as occurred at the time of the second clock signal $CL_3$, gate 105 and inverter 106 prevent the transfer of the control bit from flip-flop $1A_3$ to write flip-flop 92 via gates 104 and 97. The byte of a second information character associated with register 35 has now been accepted by register 35 and the information bits comprising this byte will subsequently be serially transmitted to write flip-flop 92, as described previously.

Additional bytes will similarly be accepted by register 35 from its associated segment of buffer 33 and the information bits of these bytes will be transmitted to write flip-flop 92, as described previously. It may be seen that the information bits transmitted to write flip-flop 92 and subsequently written onto the magnetic disk are received from three sources. An initial conditioning bit is received by flip-flop 92 from line 30. Subsequent data bits received by write flip-flop 92 are received either from register 35 via gates 104 and 97 or directly from buffer 33 itself via gates 96 and 97. In each case the first information bit of each byte is received by write flip-flop 92 from flip-flop $1C_3$ of buffer 33 and succeeding information bits of each byte are received by write flip-flop 92 from register 35.

The operation of the intermediate and low frequency channels occurs in a manner similar to that described with respect to the high frequency channel. Thus, with respect to the intermediate frequency channel, a third clock signal $CL_2$ on line 28 effects a transfer of the control bit from flip-flop $2A_2$ via gates 137 and 114 to flip-flop $2A_2$. Similarly, a fourth clock signal $CL_2$ shifts the control bit to flip-flop $1A_2$ thereby enabling gate 138 and a fifth clock signal $CL_2$ effects a transfer of the information bits of a second byte from flip-flops $3C_2$ and $2C_2$ to flip-flops $2A_2$ and $1A_2$, respectively. Again gate 116 and inverter 117 prevent the transfer of the control bit to write flip-flop 93 via gates 118 and 110 during the fifth clock signal.

The operation of the low frequency channel proceeds similarly. Thus, a third clock signal $CL_1$ on line 29 effects a transfer of the control bit from flip-flop $CA_1$ to flip-flop $1A_1$ via gates 139 and 124. Similarly, a fourth clock signal $CL_1$ effects a transfer of a second information bit from flip-flop $2C_1$ to $1A_1$ via gates 123 and 124 since gates 125 and 140 are enabled at this time. Similarly, gate 125 and inverter 126 prevent the transfer of the control bit from flip-flop $1A_1$ to write flip-flop 94 via gates 127 and 121 at the time of the fourth clock signal $CL_1$.

It may be seen that as each byte of an information character is accepted by one of the shift registers 35, 36 and 37, a control bit is established in its respective one of the flip-flops $CB_3$, $CB_2$ and $CB_1$ setting that flip-flop. When coincident set conditions in these three flip-flops occur, CCL flip-flop 68 is set and a signal is transmitted to the control unit indicating that the next information character should be placed upon the output lines of the control unit buffer 33. Thus, the presentation of the bits of each information character upon the output lines of buffer 33 occurs simultaneosuly. The bytes of these characters, however, are not received by the three channels simultaneously, but, rather, are received by the three channels in accordance with the three asynchronous clock signals of these three channels. Thus, by means of the embodiment shown in FIG. 4, information characters may be continually presented in parallel and individual bytes of these characters may be independently and asynchronously transmitted serially at different clock rates over separate channels to a recording medium.

FIG. 6 depicts an embodiment of the present invention utilizing two buffers 141 and 142, rather than a single buffer, between the shift registers 35, 36 and 37 and the control unit buffer 33 shown in FIG. 2, together with control circuitry used during a read operation. FIG. 6 does not show shift registers 35, 36 and 37 or buffer 33 of FIG. 2, but does show lines on which signals received from shift registers 35, 36 and 37 are transmitted to buffers 141 and 142 and also shows lines on which signals from buffers 141 and 142 are transmitted to control unit buffer 33. With respect to the embodiment of the present invention shown in FIG. 6, the operation of shift registers 35, 36 and 37 is identical to their operation described in connection with the discussion of FIG. 2. Thus, in each of the shift registers information bits are serially received from a disk file and a control bit shifted within each of the registers 35, 36 and 37 controls the transfer of these information bits to one or the other of the buffers 141 and 142. The state of CCL flip-flop 68 shown in FIG. 6 determines which of the two buffers 141 and 142 receives information bits from the registers 35, 36 and 37.

With respect to each channel shown in FIG. 6, lines are shown which transmit information bits stored in the shift register flip-flops to the buffer circuits 141 and 142. Thus, with respect to the high frequency channel the states of the flip-flops comprising shift register 35 are transmitted by lines designated $1A_3$, $2A_3$, $3A_3$ $4A_3$, $CA_3$ and $\overline{CA}_3$. Signals are present on the lines $1A_3$, $2A_3$, $3A_3$, $4A_3$ and $CA_3$ when their respective flip-flops of register 35 are in the set condition. A signal is present on the line $\overline{CA}_3$ when flip-flop $CA_3$ of register 35 is in the cleared condition. Coincident signals on lines $1A_3$ and $\overline{CA}_3$ are gated via gate 143 to present a signal on the line designated "Set $CA_3$." Since the operation of shift register 35 is identical to that described in connection with the discussion of FIG. 2, it may be seen that a signal is presented on the "Set $CA_3$" line during the clock period immediately preceding the clock signal $CL_3$ on line 27 which effects a shift of the control bit into flip-flop $CA_3$. Similar output lines indicative of the states of the flip-flops comprising register 36 are shown in connection with the second channel depicted in FIG. 6. Coincident signals appearing on the lines designated $1A_2$ and $\overline{CA}_2$ are gated via gate 144 to present a signal on the line designated "Set $CA_2$." Similarly, with respect to the lines shown in the third channel indicative of the states of the flip-flops comprising shift register 37, coincident signals on the lines $1A_1$ and $\overline{CA}_1$ are gated via a gate 145 to present a signal on the line designated "Set $CA_1$." The operation of the embodiment shown in FIG. 6 will now be discussed.

Assume initially that CCL flip-flop 68 is in the cleared condition. With flip-flop 68 in the cleared condition, a signal appears on its output line 146 and a signal is absent from its output line 147. Line 146 is gated to each of the gates 148 through 159 which transmit signals from the flip-flops of registers 35, 36 and 37 to corresponding flip-flops of buffer 141. Similarly, the "set" output line 147 of flip-flop 68 is connected to the input gates 160 through 171 of buffer 142. Consequently, with CCL flip-flop 68 initially in the cleared condition, all of the gates 160 through 171 are disabled and information bits from registers 35, 36 and 37 may be transferred only into buffer 141.

Attention will now be directed to the information transfers which occur in the high frequency channel. Shifts of information bits within register 35 occur in a manner identical to that described previously. In response to the clock signal $CL_3$ which shifts the control bit into flip-flop $1A_3$ of register 35, a "Set $CA_3$" signal will subsequently be presented to input gate 152, thereby clearing flip-flops $4B_{3-1}$, $3B_{3-1}$, $2B_{3-1}$ and $1B_{3-1}$ of buffer 141.

The next succeeding clock signal $CL_3$ shifts the control bit into flip-flop $CA_3$ of register 35, presents signals via gates 172 and 173 to flip-flop $CB_{3-1}$ of buffer 141 and presents signals via input gates 174 and 175 to flip-flop $CB_{3-2}$ of buffer 142. Internal cross-coupling within flip-flop $CB_{3-1}$ and $CB_{3-2}$ causes these flip-flops to switch to their opposite states at this time. Assume that prior to the appearance of the clock signal $CL_3$ effecting this switch, flip-flop $CB_{3-1}$ was in the cleared state and flip-flop $CB_{3-2}$ in the set state. Subsequently, this clock signal $CL_3$ switches flip-flop $CB_{3-1}$ to its set state and flip-flop $CB_{3-2}$ to its cleared state. As stated previously, this clock signal $CL_3$ shifts the control bit into flip-flop $CA_3$ of register 35 and, in response to this setting of flip-flop $CA_3$ by the control bit, an unclocked transfer of the complete byte of information bits from register 35 to flip-flops $4B_{3-1}$, $3B_{3-1}$, $2B_{3-1}$ and $1B_{3-1}$ of buffer 141 occurs.

The next succeeding clock signal $CL_3$ shifts the control bit from flip-flop $CA_3$ to flip-flop $3A_3$ of register 35 and clocks the control bit into flip-flop $CB_{3-1}$ of buffer 141. The state of flip-flop $CB_{3-1}$ at this time indicates that a complete byte of information bits has been transferred from register 35 to the portion of buffer 141 associated with the high frequency channel.

The operation of the transfer into the portions of buffer 141 associated with the intermediate and low frequency channels occurs in a similar manner. Thus, that clock signal $CL_2$ which shifts the control bit into flip-flop $1A_2$ of register 36 effects a subsequent unclocked clearing of flip-flops $3B_{2-1}$, $2B_{2-1}$ and $1B_{2-1}$. The subsequent clock signal $CL_2$ shifts the control bit into flip-flop $CA_2$ of register 36 and effects a subsequent unclocked transfer of a complete byte of information bits from register 36 to flip-flops $3B_{2-1}$, $2B_{2-1}$ and $1B_{2-1}$ of buffer 141. The subsequent clock signal $CL_2$ then presents signals to flip-flop $CB_{2-1}$ via gates 176 and 177 and to flip-flop $CB_{2-2}$ via gates 178 and 179 thereby switching flip-flop $CB_{2-1}$ to the set state and flip-flop $CB_{2-2}$ to the cleared state.

In a similar manner the flip-flops $2B_{1-1}$ and $1B_{1-1}$ are first cleared and subsequently receive a complete byte of information bits from register 37. A subsequent clock signal $CL_1$ then presents signals to flip-flop $CB_{1-1}$ via gates 180 and 181 and to flip-flop $CB_{1-2}$ via gates 182 and 183 thereby switching flip-flop $CB_{1-1}$ to its set state and flip-flop $CB_{1-2}$ to its cleared state.

Thus, subsequent to each byte of information bits being transferred to one of the segments of buffer 141, the CB flip-flop associated with that segment is switched to its set state. When all three of the CB flip-flops of buffer 141 have been switched to their set state, a signal is presented to flip-flop 68 via gate 184 which switches flip-flop 68 to its set state. With flip-flop 68 in its set state a signal presented on its set output line 147 causes the entire information character assembled in buffer 141 to be transmitted to buffer 33 via gates 185 through 193 and 194 through 202.

With CL flip-flop 68 now in the set state, the next byte of information bits assembled in the registers 35, 36 and 37 will subsequently be transferred into buffer 142 in a manner identical to the transfer into buffer 141 just described. Whenever a compelte byte of information bits has been transferred into a segment of buffer 142 associated with one of the channels, the CB flip-flop of that segment will be switched to its set state and the CB flip-flop of the corresponding segment of buffer 141 will be switched to its cleared state. When all three of the flip-flops $CB_{3-2}$, $CB_{2-2}$ and $CB_{1-2}$ have been switched to their set state, signals on their output lines will present a signal to flip-flop 68 via gate 203 causing flip-flop 68 to switch to its cleared condition. A signal presented on the cleared output line 146 of flip-flop 68 will then enable the entire information character then assembled in buffer 142 to be transferred via gates 204 through 212 and gates 194 through 202 to control unit buffer 33.

From the foregoing it may be seen that the condition of CCL flip-flop 68 both determines which one of the buffers 141 and 142 will receive bytes of information bits transferred from registers 35, 36 and 37 and also which one of the buffers 141 and 142 will have its contents presented to control unit buffer 33. Thus, with CCL flip-flop 68 in the cleared state, bytes assembled in registers 35, 36 and 37 are transferred to buffer 141 while buffer 142 presents a previous information character assembled therein to buffer 33. With CCL flip-flop 68 in the set state, bytes assembled in registers 35, 36 and 37 are transferred into buffer 142 and while buffer 141 presents to control unit buffer 33 a previous information character assembled therein.

The advantage of the embodiment depicted in FIG. 6 is that the output lines which present an information character ot the control unit buffer 33 remain in a given state for a much longer period of time than do the corresponding lines of the embodiment shown in FIG. 2. With respect to the operations described in FIGS. 2 and 6 wherein three channels have clock rates of 2 megacycles, 1.5 megacycles and 1 megacycle, respectively, and transfer bytes of four information bits, three bits and two bits, respectively, the output lines shown in FIG. 6 may, for example, present a complete information character for approximately 2.5 microseconds while those shown in FIG. 2 present a complete information character for approximately 0.5 microsecond. Thus, the embodiment depicted in FIG. 6 has the advantage that in instances where the control unit needs additional time in which to act upon information characters supplied to it, this embodiment provides the additional time. With respect to the embodiment of FIG. 6, an information character assembled in one buffer register or the other is present on the output lines to buffer 33 at all times. The length of time that a character is present on the output lines is then governed by the time in which a character is transmitted from the disk file to registers 35, 36 and 37.

FIG. 7 depicts the embodiment of FIG. 6 including control circuitry utilized during a write operation. CCL flip-flop 68 again determines which of the two buffers 141 and 142 will be loaded at any given time. In the embodiment shown in FIG. 7 one or the other of the buffers 141 and 142 is loaded with an information character received from control unit buffer 33 and the loaded buffer subsequently transfers this information character to the shift registers 35, 36 and 37. In a manner similar to that described in connection with the embodiment of FIG. 6, whenever one of the two buffers 141 and 142 is enabled to receive an information character from control unit buffer 33, the other one of the two buffers 141 and 142 is enabled to present an information character to the shift registers 35, 36 and 37. As in the write operation described in connection with the discussion of the embodiment of FIG. 4, a conditioning bit must be generated in each of the three channels at the commencement of the write operation. This conditioning bit is presented on lines 30, 31 and 32, shown in both FIG. 4 and FIG. 7. The operation of shift registers 35, 36 and 37 is virtually identical to that described in conjunction with the embodiment depicted in FIG. 4. In FIG. 7, however, the control bits may be inserted in flip-flops $CA_3$ $CA_2$ and $CA_1$ of registers 35, 36 and 37, respectively, in response to the first clock signal appearing in each channel subsequent to the presentation of conditioning bits on lines 30, 31 and 32 rather than inserted in these flip-flops at the time of the second clock signal appearing in each channel. Additionally, for the embodiment of FIG. 7 each of the registers 35, 36 and 37 advantageously includes an additional flip-flop $4A_3$, $3A_2$ and $2A_1$ respectively. The additional flip-flops enable the registers 35, 36 and 37 to receive the entire contents of buffer register 141 or 142. The operation of the embodiment shown in FIG. 7 will now be described.

Assume initially that CCL flip-flop 68 is in the cleared state. Consequently, the cleared output line 146 of flip-flop 68 will have a signal presented thereon which is presented to gates 213 through 224 associated with buffer 141. With CCL flip-flop 68 in the cleared state, a signal is absent from the set output line 147 of flip-flop 68 and, consequently, each of the gates 225 through 236 associated with buffer 142 is disabled. Attention is now directed to the operation of the high frequency channel shown in FIG. 7.

Initially, a signal appears on line 30 as a result of the generation of a conditioning bit for this channel. This signal is passed via gate 237 to gates 213 through 217 thereby causing a byte of information bits from control unit buffer 33 to be transferred to flip-flops $4B_{3-1}$, $3B_{3-1}$, $2B_{3-1}$ and $1B_{3-1}$ of buffer 141 and further causing a control bit to be set into flip-flop $CB_{3-1}$ of buffer 141. The next clock signal $CL_3$ clears flip-flops $4B_{3-2}$, $3B_{3-2}$, $2B_{3-2}$, $1B_{3-2}$ and $CB_{3-2}$ via gate 272. Bytes of information bits from control unit buffer 33 are similarly loaded into the segments of buffer 141 associated with the intermediate frequency and low frequency channels. Thus, a signal appearing on line 31 as a result of a generation of a conditioning bit is passed via gate 238 to input gates 218 through 221 and a signal present on line 32 as a result of the generation of a conditioning bit for the low frequency channel is passed by gate 239 and presented to the input gates 222 through 224. The next clock signals $CL_2$ and $CL_1$, then clear flip-flops $3B_{2-2}$, $2B_{2-2}$, $1B_{2-2}$ and $CB_{2-2}$, and flip-flops $2B_{1-2}$, $1B_{1-2}$ and $CB_{1-2}$, respectively, via gates 273 and 274, respectively.

When each of the three segments of buffer 141 has been loaded with a byte of information bits from buffer 33, each of the three flip-flops $CB_{3-1}$, $CB_{2-1}$ and $CB_{1-1}$ will be in the set state. As a result of these three flip-flops being in their set state, signals are presented to the input terminals of gate 240 and CCL flip-flop 68 is switched to its set state. With flip-flop 68 in its set state, a signal is presented on line 147 which signal is transmitted to control unit logic circuitry 34 shown in FIG. 1 and indicates to the control unit that a complete information character has been received by buffer 141 and that the control unit may now change the conditions of its buffer circuit 33 in order to present the next information character on its output lines. The signal on line 147 also enables the bytes of information bits stored in the three segments of buffer 141 to be presented on the output lines to the shift registers 35, 36 and 37 via gates 241 through 249 and gates 250 through 258.

With respect again to the high frequency channel, the first clock signal $CL_3$ transfers a complete byte of information bits into shift register 35 and inserts the control bit in flip-flop $CA_3$ of register 35. In a similar manner the bytes of information bits associated with the other two channels will be inserted into registers 36 and 37 and control bits will be inserted in flip-flops $CA_2$ and $CA_1$. The shift of the control bits and information bits within registers 35, 36 and 37 in response to subsequent clock signals occurs in a manner similar to that described in conjunction with the embodiment shown in FIG. 4.

Responsive to that clock signal $CL_3$ which shifts the control bit into flip-flop $1A_3$ of register 35, a signal appears on the "Set $CA_3$" line and is passed by gate 237 to an input terminal of gate 259 associated with buffer 141 and of gates 225 through 229 associated with buffer 142. In response to this signal, flip-flop $CB_{3-2}$ is set and information bits comprising a byte of a second information character are transferred from control unit buffer 33 by flip-flops $4B_{3-2}$, $3B_{3-2}$, $2B_{3-2}$ and $1B_{3-2}$. The next clock signal $CL_3$ clears flip-flops $4B_{3-1}$, $3B_{3-1}$, $2B_{3-1}$ and $CB_{3-1}$ via gate 259.

In a similar manner, a "Set $CA_2$" signal passed by gate 238 in the intermediate frequency channel enables a complete byte of information bits to be stored in flip-flops $3B_{2-2}$, $2B_{2-2}$ and $1B_{2-2}$ and stores a control bit in flip-flop $CB_{2-2}$. The next clock signal $CL_2$ then clears flip-flops $3B_{2-1}$, $2B_{2-1}$, $1B_{2-1}$ and $CB_{2-1}$ via gate 260. Similarly, with respect to the low frequency channel a "Set $CA_1$" signal passed by gate 239 causes a byte of information bit of a second information character to be transferred to flip-flops $2B_{1-2}$ and $1B_{1-2}$ and stores a control bit in flip-flop $CB_{1-2}$. The next clock signal $CL_1$ then clears flip-flops $2B_{1-1}$, $1B_{1-1}$ and $CB_{1-1}$ via gate 261.

When all of the three flip-flops $CB_{3-2}$, $CB_{2-2}$ and $CB_{1-2}$ have been switched to a set state as a result of the bytes of the second information character having been stored in buffer 142, a signal is presented to CCL flip-flop 68 via gate 262 which clears flip-flop 68. When flip-flop 68 is cleared, a signal appears on its cleared output line 146, which signal is passed to the control unit logic circuitry 34 indicating to the control unit that the second information character has now been accepted by buffer 142 and that the control unit may now present the information bits comprising the third information character on the output lines of control unit buffer circuitry 33. The signal appearing on output line 146 also enables the information character stored in buffer 142 to be presented to the shift registers 35, 36 and 37 via gates 263 through 271 and gates 250 through 258.

With respect to the high frequency channel, the shift of information bits and the control bit wtihin shift register 35 again occurs in a manner similar with that described in conjunction with the discussion with embodiment depicted n FIG. 4. At the time of the clock signal $CL_3$ which again shifts the control bit into flip-flop $1A_3$ of shift register 35, a signal appears on the "Set $CA_3$" line which is passed by gate 237 to gates 213 through 217 associated with buffer 141, thereby enabling information bits comprising a byte of a third information character to be transferred from control unit buffer 33 to flip-flops $4B_{3-1}$, $3B_{3-1}$, $2B_{3-1}$ and $1B_{3-1}$ and inserting a control bit in flip-flop $CB_{3-1}$ of buffer 141. The next succeeding clock signal $CL_3$ presents a signal to flip-flops $4B_{3-2}$, $3B_{3-2}$, $2B_{3-2}$, $1B_{3-2}$ and $CB_{3-2}$ of buffer 142 via gate 272 which again clears all of these flip-flops.

In a similar manner a "Set $CA_2$" signal passed by gate 238 effects the transference of a byte of information bits into flip-flops $3B_{2-1}$, $2B_{2-1}$ and $1B_{2-1}$ and the insertion of a control bit in flip-flop $CB_{2-1}$. A subsequent clock signal $CL_2$ then presents a signal via gate 273 which again clears flip-flops $3B_{2-2}$, $2B_{2-2}$, $1B_{2-2}$ and $CB_{2-2}$ of buffer 142. Similarly, the appearance of a "Set $CA_1$" signal in the low frequency channel is passed via gate 239 to gates 222 through 224 thereby causing information bits of a byte of a third information character to be transferred into flip-flops $2B_{1-1}$ and $1B_{1-1}$ of buffer 141 and storing a control bit in flip-flop $CB_{1-1}$ of buffer 141. A subsequent clock signal $CL_2$ then again clears flip-flops $2B_{1-2}$, $1B_{1-2}$ and $CB_{1-2}$ of Buffer 142 via gate 274. When all three bytes of the third information character have been received in buffer 141, the three flip-flops $CB_{3-1}$, $CB_{2-1}$ and $CB_{1-1}$ will again be coincidently in their set state and will present a signal to CCL flip-flop 68 via gate 240 which causes flip-flop 63 to switch to its set state. The switching of flip-flop 68 to its set state will again cause the contents of buffer 141 to be presented to shift registers 35, 36 and 37.

It may be seen that the continuous presentation of information characters to buffers 141 and 142 from the control unit will alternately be received by the buffers 141 and 142. Additionally, the contents of buffers 141 and 142 will alternately be presented to shift registers 35, 36 and 37. The embodiment shown in FIG. 7 is advantageous when the control unit is relatively slow in changing the information presented by the output lines of control unit buffer 33. With respect to the embodiments described in which the three channels have clock rates of 2 megacycles, 1.5 megacycles and 1 megacycle, respectively, and the bytes associated with these channels comprise four bits, three bits and two bits, respectively, the control unit must be able to change the information presented by the output lines of buffer 33 within approximately .5 microsecond when the embodiment depicted in FIG. 4 is utilized, but may have approximately 2 microseconds in which to make such change when the embodiment depicted in FIG. 7 is utilized.

What have been described are considered to be only illustrative embodiments of the present invention and, accordingly, it is to be understood that various and numerous other arrangements may be devised by one skilled in the art without departing from the spirit and scope of this invention.

What is claimed is:

1. A digital data processing system comprising:
digital data storage media;
a plurality of shift registers; each of the shift registers being coupled to the storage media by a transmission media channel;
means for presenting clock signals to the shift registers over the transmission channels, the clock signals presented over each channel being asynchronous with the clock signals presented over the remaining channels;
means for serially transmitting information signals between the storage media and the shift registers, over the channels associated with the respective shift registers, responsive to the clock signals presented to the respective shift registers;
a remote register;
control means for determining the coincident presence of particular conditions in each of the shift registers; and
means responsive to such determination for effecting a simultaneous parallel transfer of information signals between the plurality of shift registers and the remote register.

2. A digital data processing system comprising:
digital data storage media having a plurality of information bits stored therein;
a plurality of shift registers, a transmission channel associated with each register for serially transmitting information bits from the storage media to the register;
means for presenting clock signals to the shift registers over the transmission channels, the clock signals presented over each channel being asynchronous with the clock signals presented over the remaining channels, the clock signals causing information bits presented to the shift registers to be stepped through the bit locations of the registers;

a buffer register having segments thereof associated with respective ones of the shift registers;

control means associated with each of the shift registers for determining when a predetermined number of bits have been shifted into its associated shift register and, upon such determination, for transferring these bits into the segment of the buffer register associated with its shift register;

a remote register;

control means for determining when information bits have been transferred from all of the shift registers to their associated segments of the buffer register; and transfer means responsive to such determination for simultaneously transferring all of the information bits stored in the buffer register to the remote register.

3. A digital data processing system according to claim 2 in which the clock signals presented over each channel are presented at a different frequency rate than those presented over any of the other channels.

4. A digital data processing system according to claim 3 in which each of the shift registers has a control bit stored therein which is continually recirculated within the shift register responsive to the clock signals presented to the shift register, and in which the control means associated with each shift register determines when the predetermined number of bits have been shifted into its associated shift register by sensing the presence of the control bit in a particular control bit location of its associated shift register.

5. A digital data processing system according to claim 4 in which the digital data storage media comprises a magnetic disk having a plurality of zones thereon and in which the transmission channels transmit information bits stored in respective ones of the zones to respective ones of the shift registers.

6. A digital data processing system comprising:

a magnetic disk having information bits stored in a plurality of zones thereof, the information bits comprising a plurality of information characters, each character consisting of bits from each of the zones, the bits of a single character and within a single zone comprising a byte;

a plurality of shift registers, each of the registers being associated with one of the zones;

means including clock signal generating means for serially transmitting information bits from each zone to its respective shift register;

each of the shift registers having a control bit stored therein which is continually recirculated within the shift register responsive to clock signals presented to the shift register;

each of the shift registers shifting within its bit locations, responsive to clock signals presented thereto, the information bits received from its associated zone;

the clock signals presented to each shift register being asynchronous with and of a different frequency from the clock signals presented to any of the other shift registers;

a buffer register having segments thereof associated with respective ones of the shift registers;

control means associated with each of the shift registers for determining when the control bit within a register has been shifted to a particular control bit location and, upon such determination, for transferring a byte into the segment of the buffer register associated with its shift register;

a complete information character being present in the buffer register when each of its segments has a byte stored therein;

a remote register; and means for determining when a complete information character is present in the buffer register and, responsive to such determination, for simultaneously transferring all bits of the character to the remote register.

7. A digital data processing system comprising:

a magnetic disk having information bits stored in first, second and third zones thereof, the information bits comprising a plurality of information characters, each character comprising a byte from each of the zones, each byte comprising information bits within a single zone;

first, second, and third shift registers;

means for presenting first, second and third clock signals to the first, second, and third shift registers, respectively;

means for serially transmitting information bits from the first, second and third zones via first, second and third information lines, respectively, to the first, second and third shift registers, respectively, responsive to the clock signals presented to the registers;

the three clock signals being asynchronous and of different frequencies;

each of the shift registers comprising a number of bit locations equal to the number of bits in the bytes stored in its associated zone;

each of the shift registers having a control bit stored therein which is continually recirculated within the shift register responsive to the clock signals presented to the shift register;

each of the shift registers, responsive to its associated clock signals, shifting within its bit locations the information bits received from its associated zone;

a buffer register having first, second and third segments, each segment comprising a number of bit locations which exceeds by one the number of bit locations in the respective one of the shift registers;

control means associated with each of the shift registers for determining when the control bit within a register has been shifted to a particular control bit location and, upon such determination, for transferring to the associated segment of the buffer register information bits from the other bit locations of the shift register and from the associated information line to information bit locations of the segment and for transferring the control bit from the control bit location of the register to a control bit location of the segment, an entire byte consequently being stored in the segment;

a remote register; and means for determining when a control bit is present in the control bit locations of all three segments of the buffer register and, responsive to such determination, for simultaneously transferring all of the bits of an entire information character from the buffer register to the remote register.

8. A digital data processing system according to claim 7 in which the second clock signals are of a lower frequency than the third clock signals but of a higher frequency than the first clock signals and in which the bytes stored in the second zone comprise more bits than those stored in the first zone but fewer than those stored in the third zone.

9. A digital data processing system according to claim 8 further comprising means associated with each of the three shift registers for clearing information bits from the information bit locations of a shift register responsive to a determination that a control bit is present in its control bit location.

10. A digital data processing system according to claim 9 further comprising means associated with each of the three shift registers for determining that the next clock signal applied to its associated register will shift the control bit into the control bit location of its associated register and means, responsive to such determination for clearing a byte previously stored in the information bit locations of its associated segment of the buffer register prior to the transmission of a subsequent byte into these locations.

11. A digital data processing system according to claim 10 further comprising means responsive to the determination that a control bit is present in the control bit locations of all three segments of the buffer registers for clearing all three of these control bit locations within a predetermined time after such determination.

12. A digital data processing system according to claim 7 in which the information lines present ot the shift registers, as the first bit received from each zone of the magnetic disk, a bit which thereafter recirculates as the control bit within each shift register.

13. A digital data processing system comprising:

digital data storage media having a plurality of information bits stored therein;

a plurality of shift registers, a transmission channel associated with each register for serially transmitting information bits from the storage media to the register;

means for presenting clock signals to the shift registers over the transmission channels, the clock signals presented over each channel being asynchronous with the clock signals presented over the remaining channels, the clock signals causing information bits presented to the shift registers to be stepped through the bit locations of the registers;

a first buffer register having segments thereof associated with respective ones of the shift registers;

a second buffer register having segments thereof associated with respective ones of the shift registers;

a bistable control element;

a remote register;

means associated with each of the shift registers for determining when a predetermined number of bits have been shifted into its associated shift register;

first transfer means, responsive to such determination and to the bistable element being in its first bistable condition, for transferring these bits into the segment of the first buffer register associated with its shift register;

second transfer means, responsive to such determination and to the bistable element being in its second bistable condition, for transferring these bits into the segment of the second buffer register associated with its shift register;

first control means for determining when information bits have been transferred from all of the shift registers to their associated segments of the first buffer register;

means responsive to such determination for switching the bistable element to its second bistable condition and for simultaneously transferring all of the information bits stored in the first buffer register to the remote register;

second control means for determining when information bits have been transferred from all of the shift registers to their associated segments of the second buffer register; and means responsive to such determination for switching the bistable element to its first bistable condition and for simultaneously transferring all of the information bits stored in the second buffer register to the remote register.

14. A digital data processing system comprising:

a magnetic disk having information bits stored in first, second and third zones thereof, the information bits comprising a plurality of information characters, each character comprising a byte from each of the zones, each byte comprising information bits within a single zone;

first, second and third shift registers;

means for presenting first, second and third clock signals to the first, second and third shift registers, respectively;

means for serially transmitting information bits from the first, second and third zones via first, second and third information lines, respectively, to the first, second and third shift registers, respectively, responsive to the clock signals presented to the registers;

the three clock signals being asynchronous and of different frequencies;

each of the shift registers comprising a number of bit locations equal to the number of bits in the bytes stored in its associated zone;

each of the shift registers having a control bit stored therein which is continually recirculated within the shift register responsive to the clock signals presented to the shift register;

each of the shift registers responsive to its associated clock signals, shifting within its bit locations the information bits received from its associated zone;

a first and a second buffer register, each having first, second and third segments, each segment comprising a number of bit locations which exceeds by one the number of bit locations in the respective one of the shift registers;

a bistable control element;

a remote register;

means associated with each of the shift registers for determining when the control bit within a register has been shifted to a particular control bit location;

first transfer means, responsive to such determination and to the bistable element being in its first bistable condition, for transferring to the associated segment of the first buffer register information bits from the other bit locations of the shift register and for transferring the control bit from the control bit location of the register to a control bit location of the segment;

second transfer means, responsive to such determination and to the bistable element being in its second bistable condition, for transferring to the associated segment of the second buffer register information bits from the other bit locations of the shift register and for transferring the control bit from the control bit location of the register to a control bit location of the segment;

first control means for determining when a control bit is present in the control bit locations of all three segments of the first buffer register;

means responsive to such determination and to the bistable element being in its first bistable condition for switching the bistable element to its second bistable condition and for simultaneously transferring all of the information bits stored in the first buffer register to the remote register;

second control means for determining when a control bit is present in the control bit locations of all three segments of the second buffer register; and means responsive to such determination and to the bistable element being in its second bistable condition for switching the bistable element to its first bistable condition and for simultaneously transferring all of the information bits stored in the second buffer register to the remote register.

15. A digital data processing system according to claim 14 further comprising:

means associated with each of the three shift registers for determining that the next clock signal applied to its associated register will shift the control bit into the control bit location of its associated register;

first clearing means responsive to such determination and to the bistable element being in its first bistable condition for clearing the information bit locations of its associated segment of the first buffer register; and second clearing means responsive to such determination and to the bistable element being in its second bistable condition for clearing the information bit locations of its associated segment of the second buffer register.

16. A digital data processing system according to claim 15 further comprising means, operating simultaneously with the transferring of a control bit to the control bit location of a segment of the first buffer register by the first transfer means, for clearing the control bit location of the corresponding segment of the second buffer register; and means, operating simultaneously with the transferring of a control bit to the control bit location of a segment of the second buffer register by the second transfer means, for clearing the control bit location of the corresponding segment of the second buffer register.

17. A digital data processing system comprising:

a plurality of shift registers;

a source of information characters presenting binary information characters on its output lines, all of the bits comprising a single information character being presented simultaneously on the output lines, the source being divided into segments associated with respective ones of the shift registers;

digital data storage media;

a transmission channel associated with each register for receiving information bits in parallel from its associated segment of the information source and for transmitting these information bits serially to the storage media;

means for presenting clock signals to the shift registers, the signals presented to each register being asynchronous with those presented to any of the other registers, the clock signals presented to each register causing information bits to be shifted within the register and serially transmitted to the data storage media;

control means associated with each of the shift registers for determining when all of the information bits previously stored in the register have been transmitted to the storage media and, upon such determination, for transferring information bits in parallel to the shift register from its associated segment of the source; and control means for determining when the segments of an information character presented by the source have been accepted by all of the shift registers and, responsive to such determination, for presenting a signal to the source indicative that the next information character may be presented on its output lines.

18. A digital data processing system comprising:

a magnetic disk having first, second and third zones thereon for the storage of information bits;

first, second and third shift registers;

a source of information characters presenting binary information characters on its output lines, each character comprising three bytes presented in parallel, each byte comprising a plurality of information bits and being associated with a respective one of the registers;

means for presenting first, second and third clock signals to the first, second and third shift registers, respectively;

means for serially transmitting information bits to the first, second and third zones via first, second and third information lines, respectively, from the first, second and third shift registers, respectively responsive to the clock signals presented to the registers, the clock signals causing information bits stored in the registers to be shifted within the registers;

the three clock signals being asynchronous and of different frequencies;

each of the shift registers having a control bit stored therein which is continually recirculated with the shift register responsive to the clock signals presented to the shift register;

control means associated with each of the shift registers for determining when the control bit within a register has been shifted to a particular bit location and, upon such determination, for transferring to the shift register information bits presented on output lines of the information source associated with the register; and control means for determining when information bits have been transferred to all three shift registers and, responsive to such determination, for presenting a signal to the source indicative that the next information character may be presented on its output lines.

19. A digital data processing system according to claim 18 in which the control means associated with each of the shift registers comprises means for determining when the control bit within a register has been shifted to a particular control bit location and, upon such determination, for simultaneously transferring a first information bit of the byte associated with the register to the information line associated with the register and the remaining information bits of the byte to the register.

20. A digital data processing system according to claim 18 in which the control means for determining when information bits have been transferred to all three shift registers comprises:

first, second and third bistable elements associated respectively with the three shift registers;

a fourth bistable element;

means for switching each of the first three bistable elements to a first bistable condition in response to a determination that the control bit within its associated register has been shifted to a particular control bit location; and means for switching the fourth bistable element to a first bistable condition in response to all of the first three bistable elements being in their first bistable condition.

21. A digital data processing system comprising:

a plurality of shift registers;

a source of information characters presenting binary information characters on its output lines, all of the bits comprising a single information character being presented simultaneously on the output lines, the source being divided into segments associated with respective ones of the shift registers;

a first and a second buffer register each being divided into segments associated with respective ones of the shift registers;

digital data storage media;

a transmission channel associated with each register for receiving information bits in parallel from its associated segment of either the first or second buffer register and for transmitting these information bits serially to the storage media;

a bistable element;

means for presenting the contents of the first buffer register to the shift registers responsive to the bistable element being in its first bistable state;

means for presenting the contents of the second buffer register to the shift registers responsive to the bistable element being in its second bistable state;

means for presenting clock signals to the shift registers, the signals presented to each register being asynchronous with those presented to any of the other registers, the clock signals presented to each register causing information bits to be shifted within the register and serially transmitted to the data storage media;

means associated with each of the shift registers for determining when all of the information bits previously stored in the register have been transmitted to the storage media;

means responsive to such determination and responsive to the bistable element being in its first bistable state for transferring the contents of the associated segment of the source output lines to the corresponding segment of the second buffer register;

means responsive to such determination and responsive to the bistable element being in its second bistable state for transferring the contents of the associated segment of the source output lines to the corresponding segment of the first buffer register; and control means for determining when the contents of all of the segments of the source output lines have been transferred to the corresponding segments of one of the buffer registers and, responsive to such determination, for switching the bistable element to its opposite bistable state.

References Cited

UNITED STATES PATENTS

| | | | |
|---|---|---|---|
| 3,197,740 | 7/1965 | Terlato et al. | 340—172.5 |
| 3,267,437 | 8/1966 | Harwood | 340—172.5 |
| 3,312,948 | 4/1967 | Capozzi | 340—172.5 |
| 3,312,950 | 4/1967 | Hillman et al. | 340—172.5 |

PAUL J. HENON, *Primary Examiner.*

R. M. RICKERT, *Assistant Examiner.*